(12) United States Patent
Tseng et al.

(10) Patent No.: US 11,416,403 B2
(45) Date of Patent: *Aug. 16, 2022

(54) METHOD AND APPARATUS FOR PERFORMING PIPELINE-BASED ACCESSING MANAGEMENT IN STORAGE SERVER WITH AID OF CACHING METADATA WITH HARDWARE PIPELINE MODULE DURING PROCESSING OBJECT WRITE COMMAND

(71) Applicant: Silicon Motion Technology (Hong Kong) Limited, Kowloon (HK)

(72) Inventors: Guo-Fu Tseng, New Taipei (TW); Cheng-Yue Chang, New Taipei (TW); Kuan-Kai Chiu, Taipei (TW)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,109

(22) Filed: Feb. 4, 2021

(65) Prior Publication Data

US 2021/0157729 A1 May 27, 2021

Related U.S. Application Data

(63) Continuation of application No. 16/581,769, filed on Sep. 25, 2019, now Pat. No. 10,963,385.

(Continued)

(51) Int. Cl.
*G06F 12/0855* (2016.01)
*G06F 12/0813* (2016.01)
(Continued)

(52) U.S. Cl.
CPC .......... *G06F 12/0855* (2013.01); *G06F 3/068* (2013.01); *G06F 3/0613* (2013.01);
(Continued)

(58) Field of Classification Search
CPC .. G06F 12/0855; G06F 3/0613; G06F 3/0659; G06F 3/068; G06F 9/5016;
(Continued)

(56) References Cited

U.S. PATENT DOCUMENTS 9,262,098 B2 2/2016 Chung
10,114,586 B1 10/2018 Benisty
(Continued)

FOREIGN PATENT DOCUMENTS

CN 106462490 A 2/2017
TW 200907699 2/2009

OTHER PUBLICATIONS

Tseng, the specification, including the claims, and drawings in the U.S. Appl. No. 16/581,776, filed Sep. 25, 2019.
(Continued)

*Primary Examiner* — Hong C Kim
(74) *Attorney, Agent, or Firm* — Winston Hsu

(57) ABSTRACT

A method for performing pipeline-based accessing management in a storage server and associated apparatus are provided. The method includes: in response to a request of writing user data into the storage server, utilizing a host device within the storage server to write the user data into a storage device layer of the storage server and start processing an object write command corresponding to the request of writing the user data with a pipeline architecture of the storage server; utilizing the host device to input metadata corresponding to the user data into at least one pipeline within the pipeline architecture; and utilizing the host device to cache the metadata with a first cache module of the pipeline, for controlling the storage server completing the request without generating write amplification of the metadata, wherein the first cache module is a hardware pipeline module outside the storage device layer.

22 Claims, 13 Drawing Sheets

Related U.S. Application Data

(60) Provisional application No. 62/794,531, filed on Jan. 18, 2019.

(51) Int. Cl.
  *G06F 9/50* (2006.01)
  *G06F 12/02* (2006.01)
  *G06F 3/06* (2006.01)

(52) U.S. Cl.
  CPC .......... *G06F 3/0659* (2013.01); *G06F 9/5016* (2013.01); *G06F 12/0246* (2013.01); *G06F 12/0813* (2013.01)

(58) Field of Classification Search
  CPC .............. G06F 12/0246; G06F 12/0813; G06F 3/0679; G06F 3/061; G06F 3/0656; G06F 3/0658
  USPC ......... 711/154, 150, 118, 112, 103; 709/217; 707/756
  See application file for complete search history.

(56) References Cited

U.S. PATENT DOCUMENTS

| | | | |
|---|---|---|---|
| 10,884,933 B2* | 1/2021 | Tseng | .................. G06F 12/0813 |
| 10,963,385 B2* | 3/2021 | Tseng | .................... G06F 3/0613 |
| 2015/0212936 A1 | 7/2015 | Flynn | |
| 2015/0281297 A1 | 10/2015 | Chamberlin | |
| 2015/0331617 A1 | 11/2015 | Slik | |
| 2016/0011816 A1 | 1/2016 | Aizman | |
| 2016/0011972 A1 | 1/2016 | Flynn | |
| 2016/0140004 A1 | 5/2016 | Flynn | |
| 2017/0083285 A1* | 3/2017 | Meyers | .................. G10L 15/00 |
| 2018/0329634 A1 | 11/2018 | Traeger | |
| 2020/0125403 A1 | 4/2020 | Kamran | |
| 2020/0233805 A1 | 7/2020 | Tseng | |

OTHER PUBLICATIONS

Tseng, the specification, including the claims, and drawings in the U.S. Appl. No. 17/106,158, filed Nov. 29, 2020.

* cited by examiner

METHOD AND APPARATUS FOR PERFORMING PIPELINE-BASED ACCESSING MANAGEMENT IN STORAGE SERVER WITH AID OF CACHING METADATA WITH HARDWARE PIPELINE MODULE DURING PROCESSING OBJECT WRITE COMMAND

CROSS REFERENCE TO RELATED APPLICATIONS

This application is a continuation application and claims the benefit of U.S. Non-provisional application Ser. No. 16/581,769, now U.S. Pat. No. 10,963,385, which was filed on Sep. 25, 2019, and is included herein by reference. In addition, the U.S. Non-provisional application Ser. No. 16/581,769 claims the benefit of U.S. Provisional Application No. 62/794,531, which was filed on Jan. 18, 2019.

BACKGROUND OF THE INVENTION

1. Field of the Invention

The present invention is related to data storage, and more particularly, to a method and apparatus for performing pipeline-based accessing management in a storage server, where examples of the apparatus may include, but are not limited to: the whole of the storage server, a host device within the storage server, a processing circuit within the host device, and at least one processor/processor core (e.g. Central Processing Unit (CPU)/CPU core) running one or more program modules corresponding to the method within the processing circuit.

2. Description of the Prior Art

Developments in memory technology have enabled the wide application of various portable and non-portable memory devices (e.g. memory cards conforming to the SD/MMC, CF, MS, XD or UFS specifications, solid state drives (SSDs), embedded storage devices conforming to the UFS or EMMC specifications, etc.). Improving access control of memories in these memory devices remains an issue to be solved in the art.

NAND flash memories may comprise single level cell (SLC) and multiple level cell (MLC) flash memories. In an SLC flash memory, each transistor used as a memory cell may have either of two electrical charge values respectively corresponding to logical values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. More particularly, when the memory devices are installed at a storage system having a Ceph control architecture, some problems may occur. For example, the memory devices may suffer from severe write amplification due to the Ceph-related control. Write amplification usually comes from journal and metadata operations in the storage system, which may cause additional memory copy and data traffic in the storage system, and therefore may increase the input/output (I/O) latency and reduce the performance of the storage system. As block devices may have a certain block size (e.g. 4096 bytes or 4 KB), for any update (such as that of metadata) less than the block size, it would be amplified to the block size. The performance of the storage system may be reduced significantly due to write amplifications from the journals, the metadata and the fixed block size. In addition, the memory devices may have shorter life expectancy due to additional write amplification corresponding to the Ceph-related control. Hence, there is a need for a novel method and associated architecture to enhance the overall performance without introducing a side effect or in a way that is less likely to introduce a side effect.

SUMMARY OF THE INVENTION

It is therefore an objective of the present invention to provide a method for performing pipeline-based accessing management in a storage server, and to provide associated apparatus such as the storage server, a host device within the storage server, etc., in order to solve the above-mentioned problems.

It is another objective of the present invention to provide a method for performing pipeline-based accessing management in a storage server, and to provide associated apparatus such as the storage server, a host device within the storage server, etc., in order to achieve an optimal performance without introducing a side effect or in a way that less likely to introduce a side effect.

At least one embodiment of the present invention provides a method for performing pipeline-based accessing management in a storage server, wherein the method is applied to the storage server. The method may comprise: in response to a request of writing user data into the storage server, utilizing a host device within the storage server to write the user data into a storage device layer of the storage server and start processing an object write command corresponding to the request of writing the user data with a pipeline architecture of the storage server, wherein the storage server comprises the host device and the storage device layer, the storage device layer comprises at least one storage device that is coupled to the host device, the host device is arranged to control operations of the storage server, and said at least one storage device is arranged to store information for the storage server; during processing the object write command with the pipeline architecture, utilizing the host device to input metadata corresponding to the user data into at least one pipeline within the pipeline architecture, wherein the pipeline architecture passes through one or more intermediate layers of program modules within a plurality of program modules running on a processing circuit of the host device, and reaches the storage device layer; and during processing the object write command with the pipeline architecture, utilizing the host device to cache the metadata with a first cache module of said at least one pipeline, for controlling the storage server completing the request without generating write amplification of the metadata regarding the one or more intermediate layers of program modules, wherein the first cache module is a hardware pipeline module outside the storage device layer.

In addition to the above method, the present invention also provides a host device. The host device may comprise a processing circuit that is arranged to control the host device to perform pipeline-based accessing management in a storage server, wherein the storage server comprises the host device and a storage device layer, the storage device layer comprises at least one storage device that is coupled to the host device, the host device is arranged to control operations of the storage server, and the aforementioned at least one storage device is arranged to store information for the storage server. For example, in response to a request of writing user data into the storage server, the host device within the storage server writes the user data into the storage device layer of the storage server and starts processing an object write command corresponding to the request of writing the user data with a pipeline architecture of the storage server; during processing the object write command with the pipeline architecture, the host device inputs metadata corresponding to the user data into at least one pipeline within the pipeline architecture, wherein the pipeline architecture passes through one or more intermediate layers of program modules within a plurality of program modules running on the processing circuit of the host device, and reaches the storage device layer; and during processing the object write command with the pipeline architecture, the host device caches the metadata with a first cache module of said at least one pipeline, for controlling the storage server completing the request without generating write amplification of the metadata regarding the one or more intermediate layers of program modules, wherein the first cache module is a hardware pipeline module outside the storage device layer.

In addition to the above method, the present invention also provides a storage server. The storage server may comprise a host device and a storage device layer, where the host device is arranged to control operations of the storage server. For example, the host device may comprise a processing circuit that is arranged to control the host device to perform pipeline-based accessing management in the storage server. In addition, the storage device layer may comprise at least one storage device that is coupled to the host device, and the aforementioned at least one storage device is arranged to store information for the storage server. For example, in response to a request of writing user data into the storage server, the host device within the storage server writes the user data into the storage device layer of the storage server and starts processing an object write command corresponding to the request of writing the user data with a pipeline architecture of the storage server; during processing the object write command with the pipeline architecture, the host device inputs metadata corresponding to the user data into at least one pipeline within the pipeline architecture, wherein the pipeline architecture passes through one or more intermediate layers of program modules within a plurality of program modules running on the processing circuit of the host device, and reaches the storage device layer; and during processing the object write command with the pipeline architecture, the host device caches the metadata with a first cache module of said at least one pipeline, for controlling the storage server completing the request without generating write amplification of the metadata regarding the one or more intermediate layers of program modules, wherein the first cache module is a hardware pipeline module outside the storage device layer.

The present invention method and associated apparatus can guarantee that the whole storage server (e.g. the host device and the storage devices) can operate properly, to prevent problems in the related art, such as the write amplification problems of the storage devices due to Ceph-related control, the increased cost problem, etc. In addition, implementing the embodiments of the present invention does not significantly increase additional costs. More particularly, manufacturers of the controllers (such as the memory controllers) within the storage devices do not need to implement a new hardware architecture of the controllers, and the associated costs of designing and fabricating a new integrated circuit (IC) corresponding to the new hardware architecture can be saved. Therefore, the related art problems can be solved, and the overall cost will not increase too much. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing pipeline-based accessing management in a storage server, and the apparatus may comprise at least one portion (e.g. a portion or all) of the storage server. For example, the apparatus may comprise a portion of the storage server, such as a host device within the storage server or an associated control circuit positioned within the host device (e.g. a processing circuit running one or more program modules corresponding to the method, and associated circuits). In another example, the apparatus may comprise the whole of the storage server.

Figure 1:
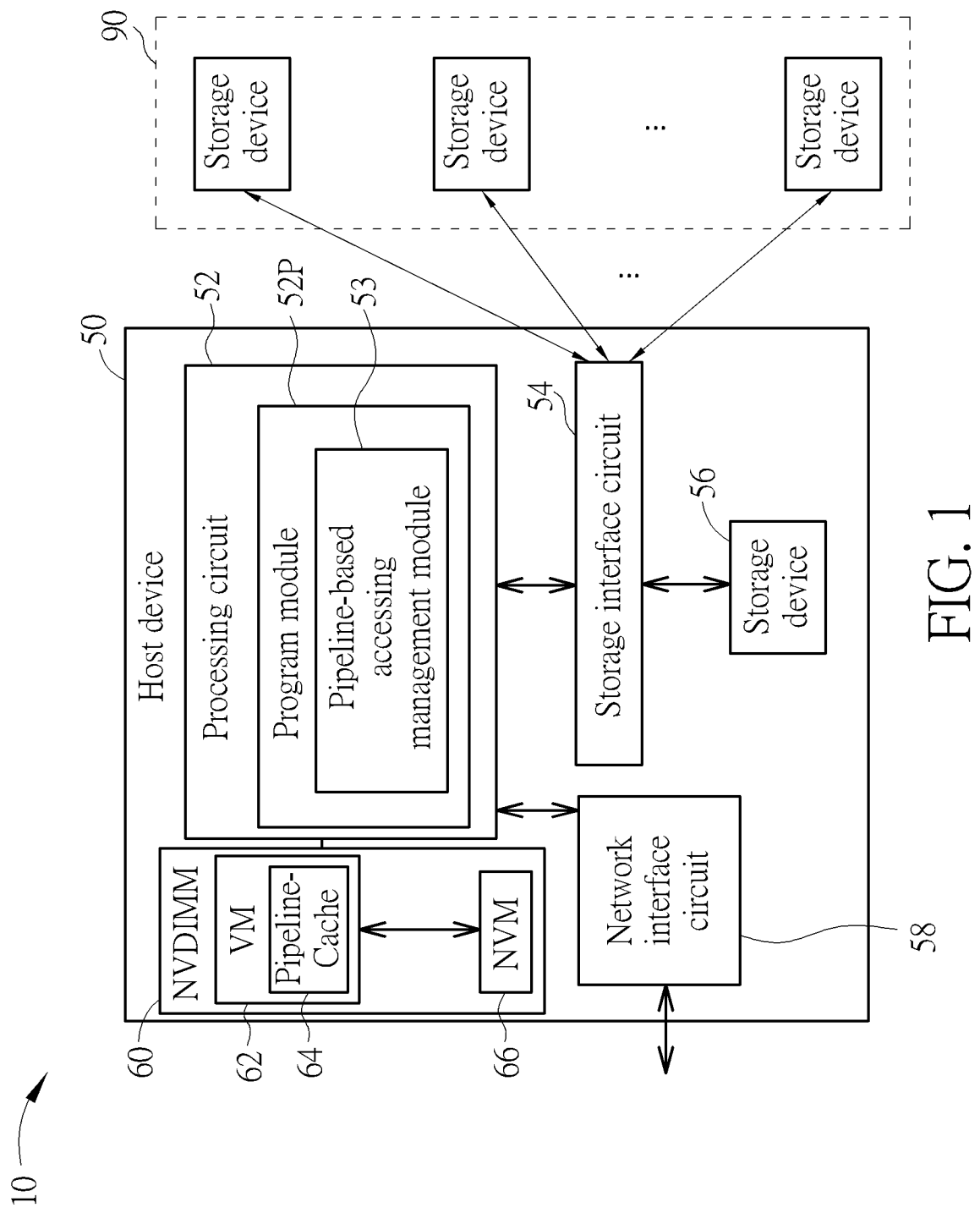
FIG. 1 is a diagram of a storage server according to an embodiment of the present invention.

FIG. 1 is a diagram of a storage server 10 according to an embodiment of the present invention. The storage server 10 may comprise a host device 50, and may comprise at least one storage device (e.g. one or more storage devices) such as a plurality of storage devices 90. The plurality of storage devices 90 are coupled to the host device 50. According to this embodiment, the host device 50 may be arranged to control operations of the storage server 10, and the plurality of storage devices 90 may be arranged to store information for the storage server 10. As shown in FIG. 1, the host device 50 may comprise a processing circuit 52 (e.g. at least one processor/processor core and associated circuits such as Random Access Memory (RAM), bus, etc.) for controlling operations of the host device 50, at least one storage interface circuit 54 for coupling the plurality of storage devices 90 and for coupling storage or memory devices (e.g. one or more Hard Disk Drive (HDDs) and/or one or more Solid State Drives (SSDs)) at the host device 50, and a network interface circuit 58 for coupling the host device 50 to at least one network. The storage or memory devices may comprise at least one storage device such as one or more storage devices, which may be collectively referred to as the storage device 56. For example, the storage device 56 may comprise a set of storage devices, where one of them may be utilized as a system disk of the host device 50, and the others may be arranged to store user data for the host device 50, but the present invention is not limited thereto. For another example, the storage device 56 may comprise one storage device, and this storage device may be utilized as the system disk of the host device 50. In addition, the host device 50 may further comprise at least one non-volatile dual in-line memory module (NVDIMM) (e.g. one or more NVDIMMs) such as the NVDIMM 60. For example, the NVDIMM 60 may comprise a volatile memory 62 and a non-volatile (NV) memory 66 (respectively labeled "VM" and "NVM" in FIG. 1, for brevity) that may be arranged to store (e.g. buffer or cache) information for the processing circuit 52 and preserve the information in the volatile memory 62 for the processing circuit 52, respectively, and may be coupled to the processing circuit 52, for being accessed by the processing circuit 52. The processing circuit 52 may access a Pipeline-Cache module 64 (labeled "Pipeline-Cache" in FIG. 1, for brevity) within the volatile memory 62, such as a storage region within the volatile memory 62.

According to this embodiment, the processing circuit 52 running program modules 52P (more particularly, a pipeline-based accessing management module 53 corresponding to the method) may be arranged to control operations of the host device 50 according to the method, for example, control the host device 50 to perform pipeline-based accessing management in the storage server 10, and the storage interface circuit 54 may conform to one or more specifications (e.g. one or more of Serial Advanced Technology Attachment (Serial ATA, or SATA) specification, Peripheral Component Interconnect (PCI) specification, Peripheral Component Interconnect Express (PCIe) specification, Non-Volatile Memory Express (NVMe) specification, NVMe-over-Fabrics (NVMeoF) specification, Small Computer System Interface (SCSI) specification, UFS specification, etc.), and may perform communications according to the one or more specifications, to allow the processing circuit 52 running the program modules 52P to access the storage device 56 and the plurality of storage devices 90 through the storage interface circuit 54. In addition, the network interface circuit 58 may be arranged to provide wired or wireless network connections, and one or more client devices corresponding to one or more users may access (e.g. read or write) user data in the storage server 10 (e.g. the storage device 56 and the plurality of storage devices 90 therein) through the wired or wireless network connections. For better comprehension, the host device 50 and the associated circuits/modules/devices in the architecture shown in the left-hand side of FIG. 1 (e.g. the processing circuit 52 running the program modules 52P, and the storage interface circuit 54 and the NVDIMM 60) may be taken as examples of the aforementioned host device and the associated circuits/modules/devices thereof (e.g. the processing circuit running the one or more program modules corresponding to the method, and the associated circuits), respectively.

In the architecture shown in FIG. 1, the storage server 10 may be illustrated to comprise the host device 50 and the plurality of storage devices 90 coupled to the host device 50, but the present invention is not limited thereto. For example, the host device 50 may further comprise a case (e.g. a computer case, which may be made of metal and/or one or more other materials) for installing the components of the host device 50 such as that shown in FIG. 1 (e.g. the processing circuit 52, the storage interface circuit 54, the network interface circuit 58, the NVDIMM 60, etc.) and at least one portion (e.g. a portion or all) of the plurality of storage devices 90. For another example, the storage server 10 may further comprise at least one switch circuit (e.g. one or more switch circuits) coupled between the host device 50 and at least one portion (e.g. a portion or all) of the plurality of storage devices 90, for performing signal switching between the host device 50 and the aforementioned at least one portion of the plurality of storage devices 90.

According to some embodiments, the processing circuit 52 running the program modules 52P or the storage interface circuit 54 may configure at least one portion (e.g. a portion or all) of the plurality of storage devices 90 to form a storage pool architecture, but the present invention is not limited thereto. According to some embodiments, the processing circuit 52 running the program modules 52P or the storage interface circuit 54 may configure at least one portion (e.g. a portion or all) of the plurality of storage devices 90 to form a Redundant Array of Independent Disks (RAID) of the storage server 10, such as an All Flash Array (AFA).

Figure 2:
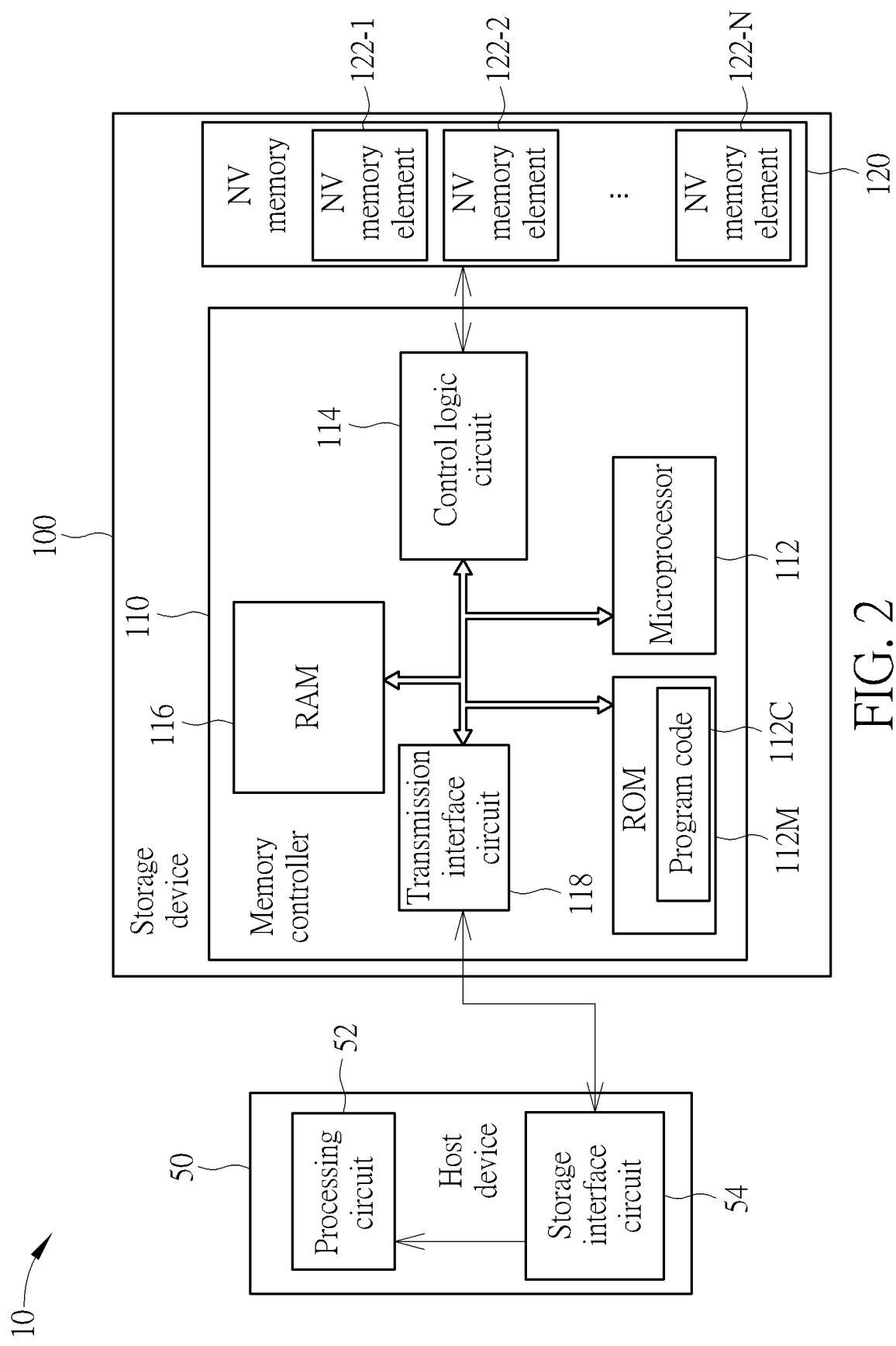
FIG. 2 illustrates some implementation details of a storage device within the storage server shown in FIG. 1 according to an embodiment of the present invention.

FIG. 2 illustrates some implementation details of a storage device within the storage server 10 shown in FIG. 1 according to an embodiment of the present invention, where the storage device 100 can be taken as an example of any of the plurality of storage devices 90. More particularly, each of the plurality of storage devices 90 may be implemented according to the architecture of the storage device 100, but the present invention is not limited thereto. The storage device 100 may be arranged for providing the host device 50 with storage space. Under control of the host device 50, the one or more client devices may assess (e.g. read or write) user data in the storage space. Examples of the host device 50 may include, but are not limited to: a personal computer such as a desktop computer and a laptop computer. Examples of the storage device 100 may include, but are not limited to: an SSD, and various types of embedded memory devices such as that conforming to the UFS or EMMC specifications, etc. According to this embodiment, the storage device 100 may comprise a controller such as a memory controller 110, and may further comprise a NV memory 120, where the controller is arranged to control operations of the storage device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

According to this embodiment, the memory controller 110 may be arranged to control the accessing of the flash memory 120, to allow the host device 50 to access the NV memory 120 through the memory controller 110, for performing accessing management in the storage server 10. As shown in FIG. 2, the memory controller 110 may comprise a processing circuit such as a microprocessor 112, a storage unit such as a read-only memory (ROM) 112M, a control logic circuit 114, a RAM 116, and a transmission interface circuit 118, where the above components may be coupled to one another via a bus. The RAM 116 is implemented by a Static RAM (SRAM), but the present invention is not limited thereto. The RAM 116 may be arranged to provide the memory controller 110 with internal storage space. For example, the RAM 116 may be utilized as a buffer memory for buffering data. In addition, the read-only memory 112M of this embodiment is arranged to store a program code 112C, and the microprocessor 112 is arranged to execute the program code 112C to control operations of the memory controller 110 for controlling the accessing of the flash memory 120, to allow the host device 50 to access the NV memory 120 through the memory controller 110. Note that, in some examples, the program code 112C may be stored in the RAM 116 or any type of memory. Further, the control logic circuit 114 may be arranged to control the flash memory 120, and may comprise a data protection circuit (not shown) for protecting data and/or performing error correction, but the present invention is not limited thereto. The transmission interface circuit 118 may conform to a specific communications specification (e.g. the SATA specification, the PCI specification, the PCIe specification, the NVMe specification, the NVMeoF specification, the SCSI specification, the UFS specification, etc.), and may perform communications according to the specific communications specification, for example, perform communications with the host device 50 for the storage device 100, where the storage interface circuit 54 may conform to the specific communications specification, for performing communications with the storage device 100 for the host device 50.

According to some embodiments, the host device 50 may transmit host commands and corresponding logical addresses to the memory controller 110 to access the storage device 100. The memory controller 110 receives the host commands and the logical addresses, and translates the host commands into memory operating commands (which may be simply referred to as operating commands), and further controls the NV memory 120 with the operating commands to perform reading, writing/programming, etc. on memory units (e.g. data pages) having physical addresses within the flash memory 120, where the physical addresses may be associated with the logical addresses. When the memory controller 110 perform an erase operation on any NV memory element 122-n of the plurality of NV memory elements 122-1, 122-2, . . . , and 122-N (in which "n" may represent any integer in the interval [1, N]), at least one block of multiple blocks of the NV memory element 122-n may be erased, where each block of the blocks may comprise multiple pages (e.g. data pages), and an access operation (e.g. reading or writing) may be performed on one or more pages.

According to some embodiments, the storage server 10 (e.g. the host device 50) may operate according to a Ceph solution, to make the storage server 10 become a portion of a distributed storage system through software definition. Preferably, a plurality of storage systems (e.g. multiple storage servers {10} such as the storage server 10) may be arranged to form a resource pool of the distributed storage system, for supporting various types of accessing, such as a block device type (e.g. for accessing an emulated block device within the distributed storage system), a file system type (e.g. for accessing a file system within the distributed storage system), and an object type (e.g. for accessing an object in object namespace within the distributed storage system), for example, with certain features such as fault tolerance, automatic failover control, etc., but the present invention is not limited thereto. For example, a file may be stored as an object in the object namespace within the distributed storage system. For another example, a data block corresponding to a certain address may be stored as an object in the object namespace within the distributed storage system. For carrying out the features of the distributed storage system, in addition to data (e.g. user data), the storage server 10 may be arranged to store additional information such as metadata and journal.

Figure 3:
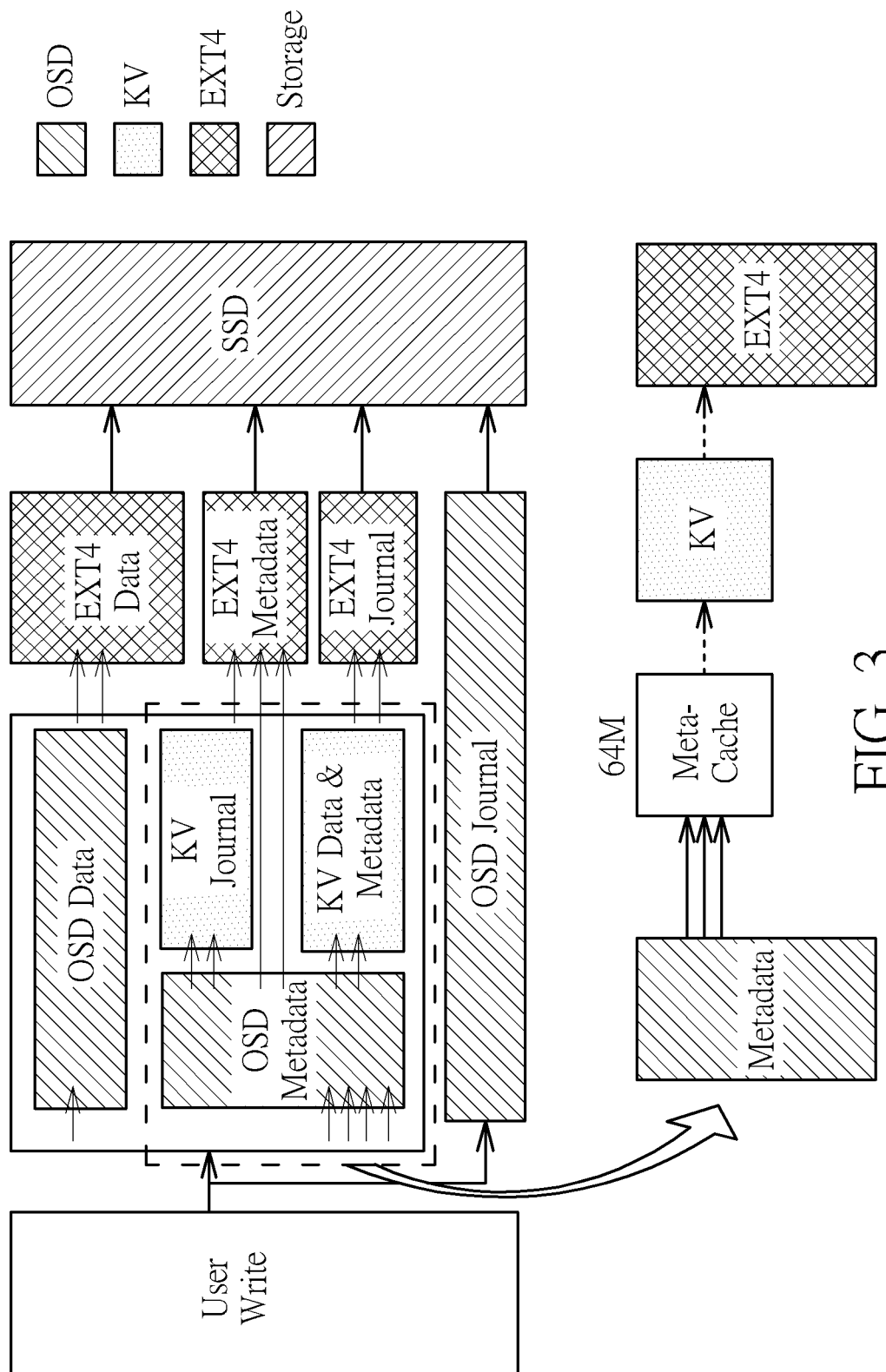
FIG. 3 is a pipeline-based cache control scheme of a method for performing pipeline-based accessing management in a storage server according to an embodiment of the present invention.

FIG. 3 is a pipeline-based cache control scheme of the method for performing pipeline-based accessing management in the storage server according to an embodiment of the present invention. The method can be applied to the storage server 10, and more particularly, can be applied to the host device 50 comprising the processing circuit 52 running the program modules 52P (e.g. the pipeline-based accessing management module 53 corresponding to the method), together with each of the plurality of storage devices 90, such as the storage device 100 comprising the memory controller 110, where the control circuit such as the processing circuit 52 running the pipeline-based accessing management module 53 may control the host device 50 to operate according to the method. For example, the storage server 10 may operate according to the Ceph solution, and the present invention method and the associated apparatus (e.g. the host device 50, and more particularly, the processing circuit 52 running the pipeline-based accessing management module 53) can perform access control with a novel pipeline architecture to achieve an optimal performance without introducing a side effect or in a way that less likely to introduce a side effect. The pipeline architecture may utilize the aforementioned at least one NVDIMM (e.g. one or more NVDIMMs) such as the NVDIMM 60 as the medium of storage journal, and may utilize the aforementioned at least one NVDIMM such as the NVDIMM 60 as the medium of storage metadata. In addition, the NVDIMM 60 may comprise a controller (e.g. a memory controller that is similar to the memory controller 110 of the storage device 100) for controlling operations of the NVDIMM 60, and the NV memory 66 may have similar architecture as that of the NV memory 120 and may comprise one or more NV memory elements corresponding to a NV memory element count N', where the NV memory element count N' may represent a positive integer, but the present invention is not limited thereto. For example, the volatile memory 62 may be a Dynamic RAM (DRAM), and the NV memory 66 may be a Flash memory comprising N' flash memory chips or N' plurality of flash memory dies. Additionally, the NVDIMM 60 may obtain normal power (e.g. one or more driving voltages) from the power supply of the storage server 10 through the bus in a normal mode of the storage server 10, and may obtain emergency power from a backup power source (e.g. a battery within the storage server 10, or a supercapacitor (SC) within the NVDIMM 60) in a failover mode of the storage server 10. The controller of the NVDIMM 60 may utilize the NV memory 66 to preserve the information stored or buffered in the volatile memory 62 (e.g. the Pipeline-Cache module 64) according to a flush command from the processing circuit 52. For example, the processing circuit 52 may send the flush command in the normal mode or the failover mode.

For better comprehension, assume that a write amplification reduction mechanism of the pipeline-based accessing management module 53 may be temporarily disabled, and some program modules related to the present invention may be illustrated as shown in the upper half of FIG. 3. As the storage server 10 may operate according to the Ceph solution, the associated program modules may comprise an Object Storage Device (OSD) Data module, an OSD Metadata module, an OSD Journal module, a Key-Value (KV) Data and Metadata module, a KV Journal module, a Fourth Extended File System (EXT4) Data module, an EXT4 Metadata module, and an EXT4 Journal module (respectively labeled "OSD Data", "OSD Metadata", "OSD Journal", "KV Data & Metadata", "KV Journal", "EXT4 Data", "EXT4 Metadata", and "EXT4 Journal" in FIG. 3, for brevity), arranged to record (e.g. write) OSD data, OSD metadata, an OSD journal, KV data and metadata, a KV journal, EXT4 data, EXT4 metadata, and an EXT4 journal according to the Ceph solution, respectively, where these program modules may belong to one or more intermediate layers of program modules within the program modules 52P, but the present invention is not limited thereto. More particularly, the Metadata modules such as the OSD Metadata module, the KV Data and Metadata module, and the EXT4 Metadata module may generate or update the corresponding metadata such as the OSD metadata, the KV metadata, and the EXT4 metadata, respectively, and the Journal modules such as the OSD Journal module, the KV Journal module, and the EXT4 Journal module may generate or update the corresponding journals such as the OSD journal, the KV journal, and the EXT4 journal, respectively. When the storage server 10 receives a write command from a client device through the network interface circuit 58, the processing circuit 52 running the program modules 52P (e.g. an upper layer above the one or more intermediate layers within the program modules 52P) may translate the write command into a translated write command such as an object write command regarding the object namespace, for indicating a user write request such as the request of writing user data (labeled "User Write" in FIG. 3, for brevity), where the object write command may be accompanied with an object name according to the Ceph solution. The translated write command such as the object write command may be transmitted to certain program modules within the one or more intermediate layers.

As all of the program modules within the one or more intermediate layers may operate according to the Ceph solution, severe write amplification may be introduced in a situation where the write amplification reduction mechanism of the pipeline-based accessing management module 53 is temporarily disabled. At least one portion (e.g. a portion or all) of the arrows shown in the upper half of FIG. 3, such as the arrows pointing toward these program modules, may indicate the associated write amplification that may be reduced by the write amplification reduction mechanism of the pipeline-based accessing management module 53. For example, the numbers of arrows of multiple parts of the architecture may approximately indicate the corresponding write amplification values, respectively. The present invention method and the associated apparatus can reduce the write amplification in an extreme manner (e.g. reduce the numbers of arrows and/or remove the arrows), in order to minimize the overall write amplification.

The pipeline architecture may comprise a metadata module such as the OSD Metadata module, a Meta-Cache module 64M (labeled "Meta-Cache" in FIG. 3, for brevity) within the Pipeline-Cache module 64, at least one KV module (e.g. one or more KV modules) such as the KV Data and Metadata module and the KV Journal module, and at least one EXT4 module (e.g. one or more EXT4 modules) such as the EXT4 Journal module and the EXT4 Metadata module as shown in the lower half of FIG. 3. These modules may be regarded as pipeline modules of at least one pipeline (e.g. one or more pipelines), where the Meta-Cache module 64M may be regarded as a hardware pipeline module, while the other modules may be regarded as software pipeline modules, but the present invention is not limited thereto. In comparison with the architecture shown in the upper half of FIG. 3, a pipeline module such as the Meta-Cache module 64M may be inserted into the pipeline for processing the metadata. For example, the pipeline architecture may utilize this pipeline module to access the NVDIMM 60. As long as the associated storage space of the storage region in the NVDIMM 60 for this pipeline module is sufficient, the flow to the subsequent modules in the pipeline architecture (e.g. the KV module and the EXT4 module) may become inactive (illustrated with arrows of dashed lines as shown in the lower half of FIG. 3, for better comprehension). For example, the processing circuit 52 running the program modules 52P may control the storage server 10 to provide a plurality of nodes (e.g. four nodes), and may utilize a certain NVDIMM within the aforementioned at least one NVDIMM, such as the NVDIMM 60, as a dedicated NVDIMM corresponding to this node, for performing metadata and journal management regarding the accessing of a set of storage devices (e.g. six storage devices) corresponding to this node within the plurality of storage devices 90; the storage capacity of each of the plurality of storage devices 90 may be 4 Terabytes (TB); and when the size of the storage space of the storage region in the NVDIMM 60 may reach (e.g. be greater than or equal to) 32 Gigabytes (GB), the pipeline architecture may operate correctly without activating the flow to the subsequent modules; but the present invention is not limited thereto. In some embodiments, the write amplification reduction mechanism of the pipeline-based accessing management module 53 may activate the flow to the subsequent modules when there is a need.

According to some embodiments, the processing circuit 52 running the program modules 52P may store cached information (e.g. the Metadata) in the NVDIMM 60, and flush the Pipeline-Cache module 64 (e.g. the Meta-Cache module 64M) when at least one predetermined condition (e.g. one or more predetermined conditions) of a plurality of predetermined conditions is satisfied, where the processing circuit 52 may send the flush command to the NVDIMM 60 to flush the cached information in the Pipeline-Cache module 64 within the NVDIMM 60 (e.g. the Metadata in the Meta-Cache module 64M) into the storage device layer (labeled "Storage" in FIG. 3, for brevity) within the storage server 10, for example, one or more storage devices within the plurality of storage devices 90, such as the storage device 100 (e.g. the SSD), but the present invention is not limited thereto. The plurality of predetermined conditions may comprise: the storage server 10 is idle; and the Pipeline-Cache module 64 has high cache pressure (e.g. the size of the cached information in the Pipeline-Cache module 64 reaches a predetermined value). As a result, the processing circuit 52 running the program modules 52P may continue using the Meta-Cache module 64M within the Pipeline-Cache module 64 to cache and keep the storage metadata (e.g. the latest version of the OSD metadata, such as the updated OSD metadata) most of the time. When the storage server 10 is idle and the Pipeline-Cache module 64 has high cache pressure, the processing circuit 52 may flush the storage metadata in the Meta-Cache module 64M within the Pipeline-Cache module 64 into the storage device layer, for example, through the aforementioned at least one KV module (e.g. the KV Data and Metadata module and the KV Journal module) and the aforementioned at least one EXT4 module (e.g. the EXT4 Journal module and the EXT4 Metadata module) and the associated flush paths (e.g. the arrows depicted with dashed lines as shown in the lower half of FIG. 3).

According to some embodiments, sending the flush command may be implemented through sending a Cache Line Write Back (CLWB) command, and the write amplification reduction mechanism of the pipeline-based accessing management module 53 may utilize the CLWB command to trigger the flushing operations, for example, through an on-die memory controller of a processor within the processing circuit 52, but the present invention is not limited thereto. According to some embodiments, an Asynchronous DRAM Refresh (ADR) control scheme may be applied to the processing circuit 52, and the Pipeline-Cache module 64 may be utilized as one of multiple ADR protected buffers. The processing circuit 52 (e.g. the processor/processor core therein) may flush the ADR protected buffers and put all of the aforementioned at least one NVDIMM such as the NVDIMM 60 in a self-refresh status, and assert a flag such as an ADR complete flag. In response to asserting the flag, the aforementioned at least one NVDIMM such as the NVDIMM 60 may isolate the volatile memory 62 (e.g. the DRAM) from the host (e.g. the processing circuit 52) and switch to the backup power source such as the supercapacitor to operate according to the supercapacitor power, and copy information (e.g. the cached information) in the volatile memory 62 into the NV memory 66 to preserve the information, and then turn off the supercapacitor.

Some implementation details regarding the pipeline-based cache control scheme shown in FIG. 3 may be described as follows. According to some embodiments, the pipeline architecture may utilize the aforementioned at least one NVDIMM such as the NVDIMM 60 (e.g. the Pipeline-Cache module 64) as the medium for caching the storage metadata (e.g. the OSD metadata) as described above. Similarly, the pipeline architecture may utilize the aforementioned at least one NVDIMM (e.g. one or more NVDIMMs) such as the NVDIMM 60 as the medium for caching the storage journal (e.g. the OSD journal). For better comprehension, assume that the aforementioned at least one NVDIMM may comprise a certain NVDIMM such as the NVDIMM 60 for a certain node of the plurality of nodes in a one NVDIMM per node configuration. In this situation, the Pipeline-Cache module 64 may comprise multiple sub-modules such as sub-cache modules 64A and 64B, for cashing the storage metadata (e.g. the OSD metadata) and the storage journal (e.g. the OSD journal), respectively, where the sub-cache module 64A may represent the Meta-Cache module 64M. For example, within the aforementioned at least one pipeline (e.g. the one or more pipelines) such as that shown in the lower half of FIG. 3, the sub-cache module 64A may be arranged between the metadata module (e.g. the OSD Metadata module) and the aforementioned at least one KV module (e.g. the KV Data and Metadata module and the KV Journal module). For another example, within another pipeline of the pipeline architecture, the sub-cache module 64B may be arranged between a journal module such as the OSD Journal module and the storage device layer. Both of the aforementioned at least one pipeline and the other pipeline of the pipeline architecture may be arranged to transmit information (e.g. the respective data, the respective metadata, and the respective journals of OSD, KV, and EXT4) in a write direction, such as a direction from the upper layer to the storage device layer through the one or more intermediate layers, and the processing circuit 52 running the program modules 52P (e.g. the pipeline-based accessing management module 53 corresponding to the method) may utilize the sub-cache modules 64A and 64B to cache the storage metadata (e.g. the latest version of the OSD metadata, such as the updated OSD metadata) and the storage journal (e.g. the latest version of the OSD journal, such as the updated OSD journal), respectively, to eliminate the subsequent information flows in these pipelines of the pipeline architecture most of the time. Therefore, the present invention method and associated apparatus can greatly reduce the overall write amplification and enhance the overall performance.

According to some embodiments, the aforementioned at least one NVDIMM may comprise a plurality of NVDIMMs $\{60\}$ such as $N_{NVDIMM}$ NVDIMMs $\{60\_1, \ldots, 60\_N_{NVDIMM}\}$, where the NVDIMM count $N_{NVDIMM}$ of the NVDIMMs $\{60\_1, \ldots, 60\_N_{NVDIMM}\}$ may be a positive integer greater than one. The $N_{NVDIMM}$ NVDIMMs $\{60\_1, \ldots, 60\_N_{NVDIMM}\}$ may have the same architecture as that of the NVDIMM 60. For example, the NVDIMM 60_1 may comprise a volatile memory 62_1 and a NV memory 66_1, and a Pipeline-Cache module 64_1 may be set up within the volatile memory 62_1; the NVDIMM 60_2 may comprise a volatile memory 62_2 and a NV memory 66_2, and a Pipeline-Cache module 64_2 may be set up within the volatile memory 62_2; and the rest may be deduced by analogy. In addition, the host device 50 may operate with the one NVDIMM per node configuration as described above, where the Pipeline-Cache module 64_1 within the volatile memory 62_1 may play the role of the sub-cache module 64A, and the Pipeline-Cache module 64_2 within the volatile memory 62_2 may play the role of the sub-cache module 64B, but the present invention is not limited thereto. For example, the aforementioned at least one NVDIMM may comprise multiple NVDIMMs such as the NVDIMMs 60_1 and 60_2 for a certain node of the plurality of nodes in a multi-NVDIMM per node configuration. More particularly, the processing circuit 52 running the program modules 52P (e.g. the pipeline-based accessing management module 53 corresponding to the method) may utilize respective sub-modules (such as sub-cache modules {64_1A, 64_1B} and {64_2A, 64_2B}) of the Pipeline-Cache modules 64_1 and 64_2 to cache the storage metadata (e.g. the latest version of the OSD metadata, such as the updated OSD metadata) and the storage journal (e.g. the latest version of the OSD journal, such as the updated OSD journal), respectively, to eliminate the subsequent information flows in these pipelines of the pipeline architecture most of the time. In some embodiments, the processing circuit 52 running the program modules 52P (e.g. the pipeline-based accessing management module 53 corresponding to the method) may utilize the Pipeline-Cache modules 64_1 and 64_2 to cache the storage metadata (e.g. the latest version of the OSD metadata, such as the updated OSD metadata) and the storage journal (e.g. the latest version of the OSD journal, such as the updated OSD journal), respectively, to eliminate the subsequent information flows in these pipelines of the pipeline architecture most of the time, but the present invention is not limited thereto.

No matter whether the host device 50 operates with the one NVDIMM per node configuration or the multi-NVDIMM per node configuration, the pipeline architecture having at least one cache module (e.g. one or more cache modules, such as the Pipeline-Cache module 64, the sub-cache modules 64A and 64B, the Pipeline-Cache modules 64_1 and 64_2, etc.) can drastically ease the write amplification in storage operations, and more particularly, can improve the lifetime of the underlying storage devices (e.g. SSDs) in the storage device layer and reduce data traffic in and/or between the plurality of storage systems (e.g. the multiple storage servers {10} such as the storage server 10). In addition, the pipeline architecture equipped with the aforementioned at least one cache module can reduce unwanted effects due to the Ceph solution, such as the higher input/output (I/O) latency, the greater amount of memory copy, and the greater number of locks in comparison with a non-Ceph architecture, and more particularly, can make the storage server 10 obtain near full-utilization of the storage devices (e.g. SSDs) in the storage device layer and write data directly to the storage devices (e.g. SSDs) with ease. For example, the pipeline architecture may be arranged to have a designated set of buffers (e.g. sub-cache modules 64A and 64B, the Pipeline-Cache modules 64_1 and 64_2, etc.) to increase the write throughput. For another example, the pipeline architecture may comprise a tier-based storage architecture of metadata to reduce the response time in querying data. As a result of implementing according to the present invention, the goal of enhancing the overall performance can be achieved.

According to some embodiments, the pipeline architecture having the aforementioned at least one cache module (e.g. one or more cache modules, such as the Pipeline-Cache module 64, the sub-cache modules 64A and 64B, the Pipeline-Cache modules 64_1 and 64_2, etc.) may receive the user data from network (e.g. the OSD data received from the one or more client devices through the wired or wireless network connections) directly into the NVDIMM 60, and may generate the corresponding metadata of user write (e.g. the OSD metadata) directly into the NVDIMM 60, and may further write the associated journal (e.g. the OSD journal), for example, by encoding the header of transaction into the NVDIMM 60. As the data or information flows of the above operations enter the NVDIMM 60 first, and as the corresponding metadata and the associated journal may be generated, changed, or updated in the NVDIMM 60, the subsequent information flows from the one or more intermediate layers toward the storage device layer, together with the write amplification corresponding to the subsequent information flows, can be greatly reduced (more particularly, eliminated), and therefore, the overall write amplification can be greatly reduced. As a result of implementing according to the present invention, the goal of enhancing the overall performance can be achieved.

According to some embodiments, the present invention method and the associated apparatus (e.g. the host device 50, and more particularly, the processing circuit 52 running the pipeline-based accessing management module 53) may merely utilize the aforementioned at least one cache module (e.g. one or more cache modules, such as the Pipeline-Cache module 64, the sub-cache modules 64A and 64B, the Pipeline-Cache modules 64_1 and 64_2, etc.) of the pipeline architecture, rather than the storage device layer, to store the storage metadata (e.g. the OSD metadata) and the storage journal (e.g. the OSD journal). In this situation, the subsequent information flows from the one or more intermediate layers toward the storage device layer are eliminated, and therefore, cashing the storage metadata (e.g. the OSD metadata) and the storage journal (e.g. the OSD journal) in the aforementioned at least one cache module of the pipeline architecture may be regarded as storing the storage metadata (e.g. the OSD metadata) and the storage journal (e.g. the OSD journal) in the aforementioned at least one cache module of the pipeline architecture.

Figure 4:
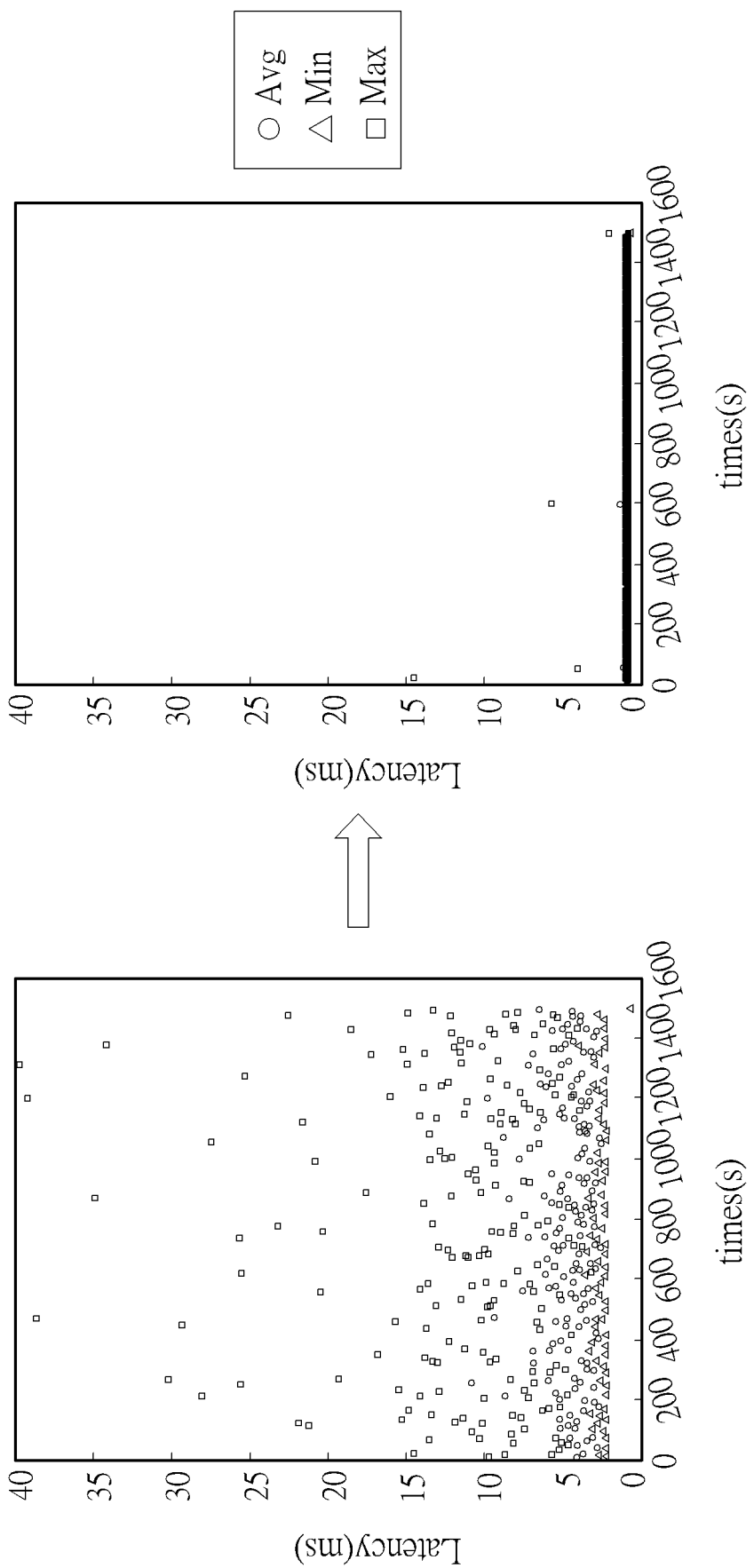
FIG. 4 illustrates performance enhancement corresponding to the method shown in FIG. 3 according to an embodiment of the present invention.

FIG. 4 illustrates the performance enhancement corresponding to the method shown in FIG. 3 according to an embodiment of the present invention. For better comprehension, a first client latency plot obtained from measuring the client latency of an ordinary Ceph server at a client device may be illustrated as shown in the left half of FIG. 4, and a second client latency plot obtained from measuring the client latency of the storage server 10 at this client device may be illustrated as shown in the right half of FIG. 4, where the legend such as Max, Min, and Avg may stand for maximum, minimum, and average, respectively. For example, the measurement results (e.g. the data points) in the first client latency plot seem to spread upward and reach 40 milliseconds (ms). In addition, the majority of the measurement results (e.g. the data points) in the second client latency plot seem to stay low and close to each other, which means the overall latency with respect to time can be greatly reduced. Therefore, the pipeline architecture equipped the aforementioned at least one cache module can indeed accelerate the storage system (e.g. the storage server 10).

Figure 5:
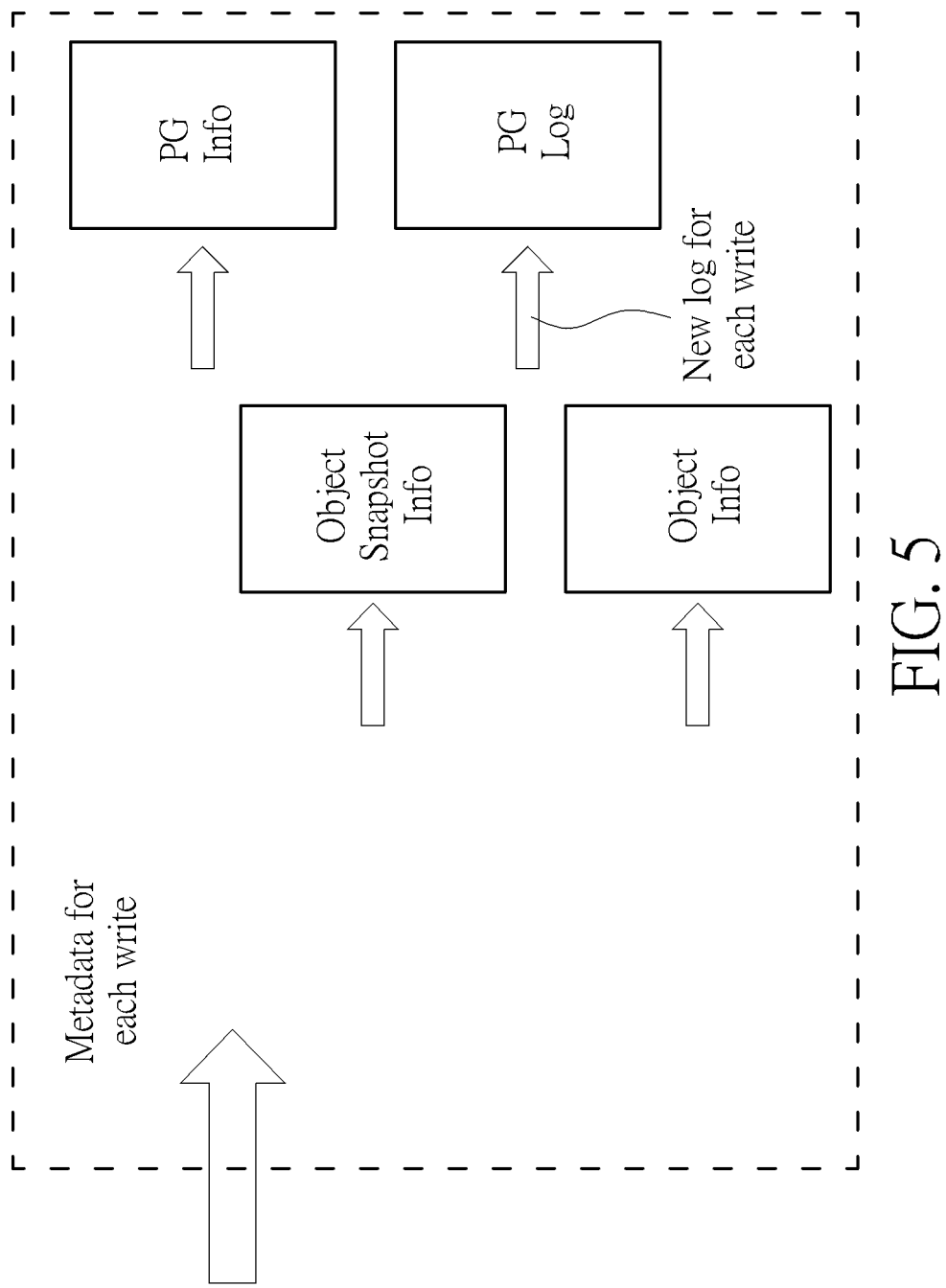
FIG. 5 illustrates Object Storage Device (OSD) metadata for each write operation (e.g. an object write operation), such as the associated information to be stored.

FIG. 5 illustrates the OSD metadata for each write operation (e.g. an object write operation in response to the object write command), such as the associated information to be stored. For example, at least one portion (e.g. a portion or all) of the information may be stored as a plurality of sets of key (K) and value (V). According to this embodiment, the present invention method and the associated apparatus may update (more particularly, re-write) the object information (Info), the object snapshot information, the placement group (PG) information, and the PG log, for example, through maintaining the OSD metadata in the NVDIMM 60. When the OSD metadata is stored as Key-Value (KV) sets, the respective keys of the PG information, the PG log, the object information, and the object snapshot information may carry the PG name plus fixed postfix, the PG name plus log version, the object name plus fixed postfix, and the object name plus fixed postfix, respectively, and the respective value lengths of the PG information, the PG log, the object information, and the object snapshot information may be at least hundreds of bytes, about one hundred and eighty or more bytes (for writing a certain type of data object), hundreds to thousands of bytes, and at least tens of bytes for empty information, respectively, but the present invention is not limited thereto. In addition, a PG may comprise multiple objects. For example, the PG may be utilized as a unit for performing recovery, a unit for moving objects, and/or a unit for balancing the numbers of objects between a plurality of block devices in the storage system such as storage server 10 (e.g. when a new block device such as a new SSD is added into the storage system). As the information flows regarding the OSD metadata for each write operation (e.g. the object write operation) enter the NVDIMM 60 first, and as the object information, the object snapshot information, the PG information, and the PG log may be generated, changed, or updated in the NVDIMM 60, the subsequent information flows from the one or more intermediate layers toward the storage device layer, together with the write amplification corresponding to the subsequent information flows, can be greatly reduced (more particularly, eliminated), and therefore, the overall write amplification can be greatly reduced. As a result of implementing according to the present invention, the goal of enhancing the overall performance can be achieved.

Figure 6:
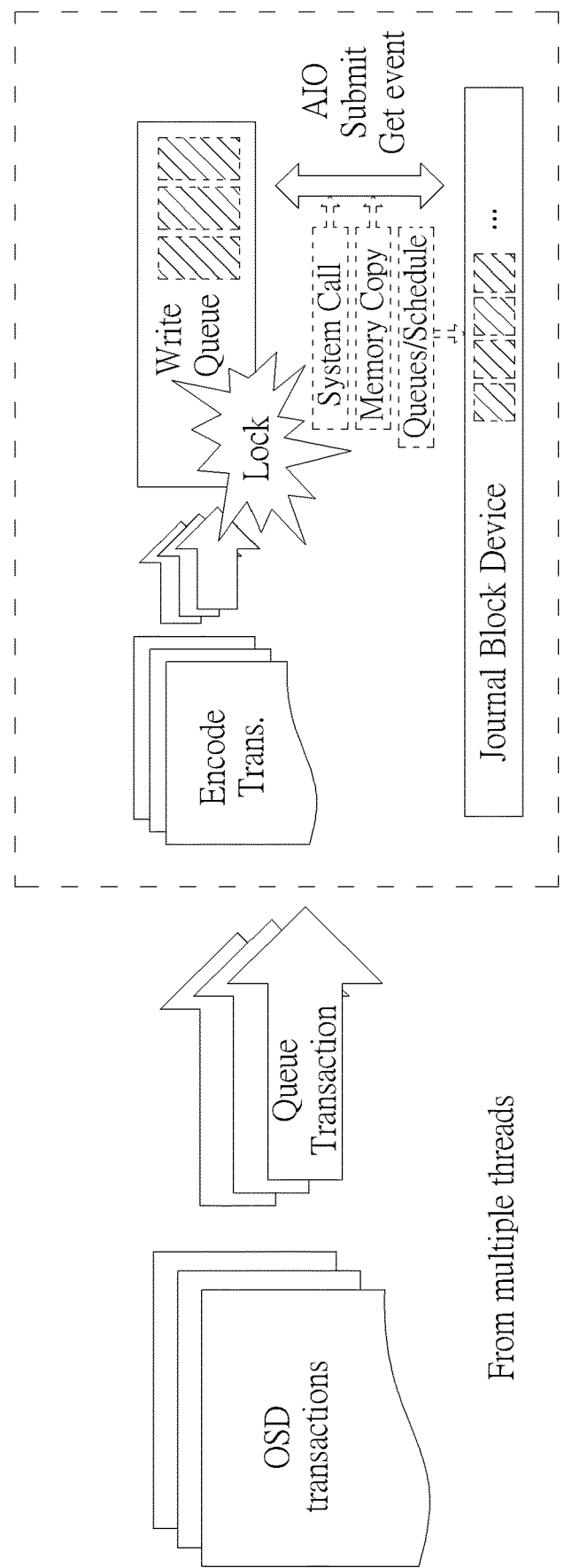
FIG. 6 illustrates a series of operations of an original OSD journal control scheme.

FIG. 6 illustrates a series of operations of an original OSD journal control scheme. For better comprehension, assume that the write amplification reduction mechanism of the pipeline-based accessing management module 53 may be temporarily disabled, and some original behaviors corresponding to the severe write amplification in this situation may be illustrated as shown in FIG. 6, but the present invention is not limited thereto. As interacting with the Operating System (OS) kernel is typically required, the overall performance may be degraded in this situation. For example, a plurality of OSD transactions from multiple threads may be respectively received, and may be respectively queued (labeled "Queue Transaction" in FIG. 6, for brevity). Although respectively encoding the transactions (labeled "Encode Trans." in FIG. 6, for brevity) may be performed, in the operations of the write queue, the journal block device, and the associated interactions (e.g. all in one (AOI) submit and get events), various problems such as the lock, the system call, the memory copy, and the queues/schedule problems may occur. More particularly, the series of operations of the original OSD journal control scheme may comprise: switching from the user space to the kernel space through the system call to perform transmission between the user space and the kernel space; performing the memory copy; accessing the journal block device through the queues/schedule; and some operations corresponding to the reverse direction. In addition, based on the original OSD journal control scheme, these transactions may be encoded and collected together first, and then sent into the RAM in the processing circuit 52, and then processed with the OS Kernel Block I/O, and sent to the storage device layer (e.g. one of the plurality of storage devices 90, such as an SSD) through DMA write. As the user data corresponding to a certain transaction with these transactions may need to be stored in an external buffer, and as the OSD metadata corresponding to this transaction may be expressed with a complicated tree data structure having a great amount of keys (K) and values (V) at various locations within the RAM in the processing circuit 52, the processing regarding this transaction may be complicated, and the processing regarding all of these transactions may correspond to significant heavy working load. For example, the whole process may be clogged by a great number of locks of the queued transactions in the write queue, and may be delayed by the system call, the memory copy, etc., and more particularly, may need to wait for the queues/schedule of the journal block device. As a result, the overall response time of the storage system may be increased.

Figure 7:
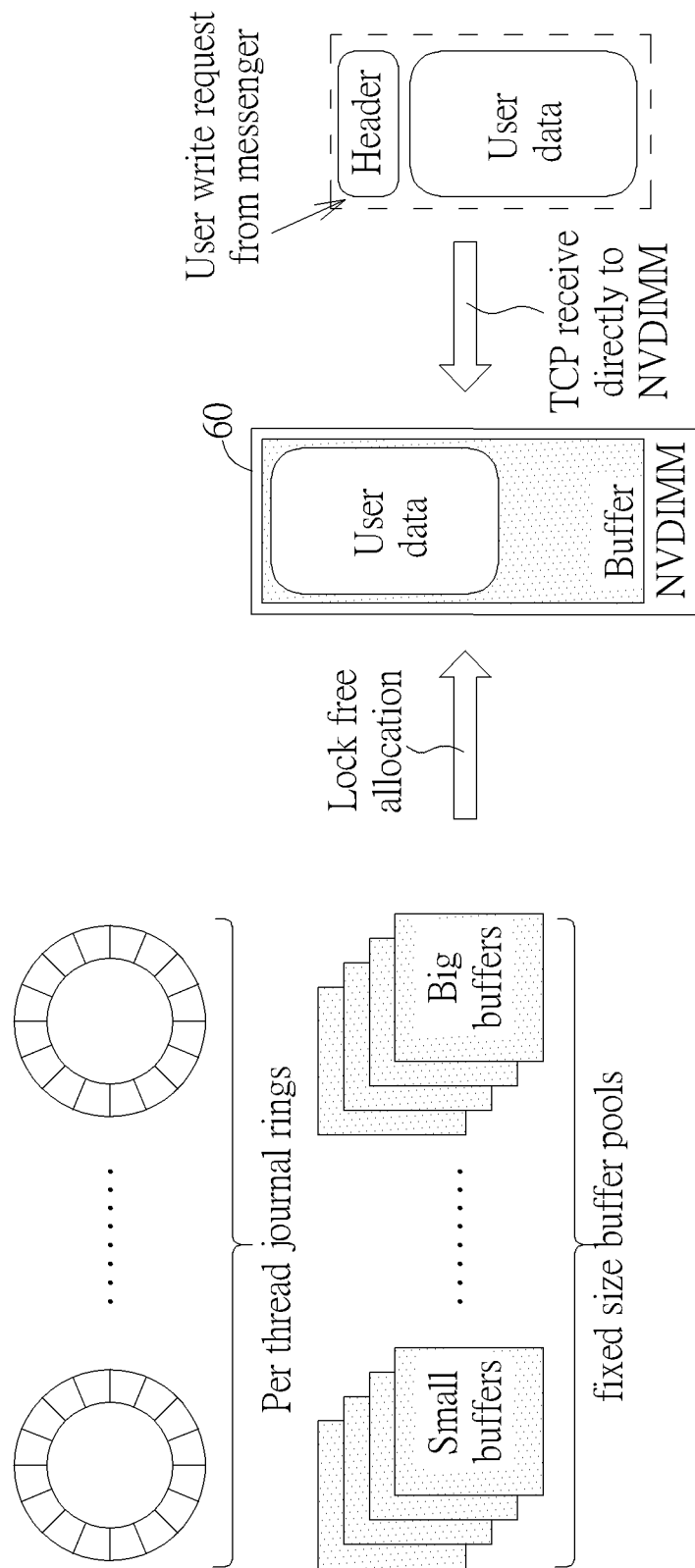
FIG. 7 illustrates a plurality of per thread journal rings in a specialized OSD journal control scheme of the method shown in FIG. 3 and a portion of associated operations in the specialized OSD journal control scheme according to an embodiment of the present invention.
Figure 8:
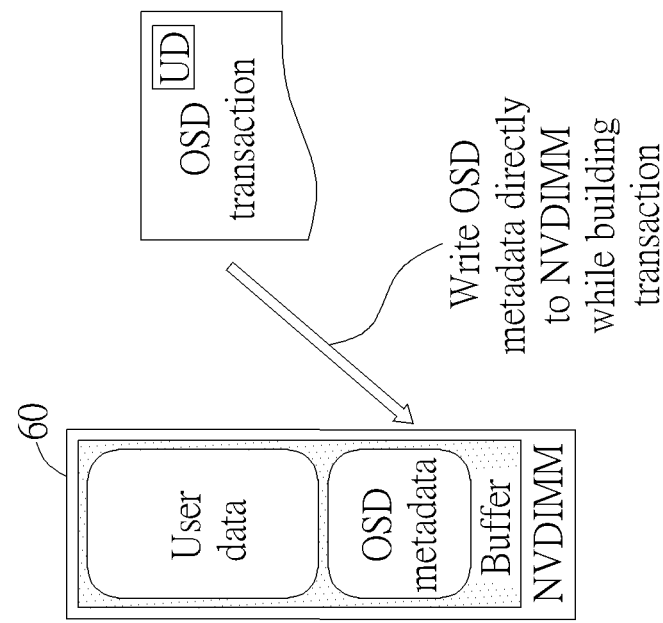
FIG. 8 illustrates another portion of the associated operations of the specialized OSD journal control scheme shown in FIG. 7.
Figure 8:
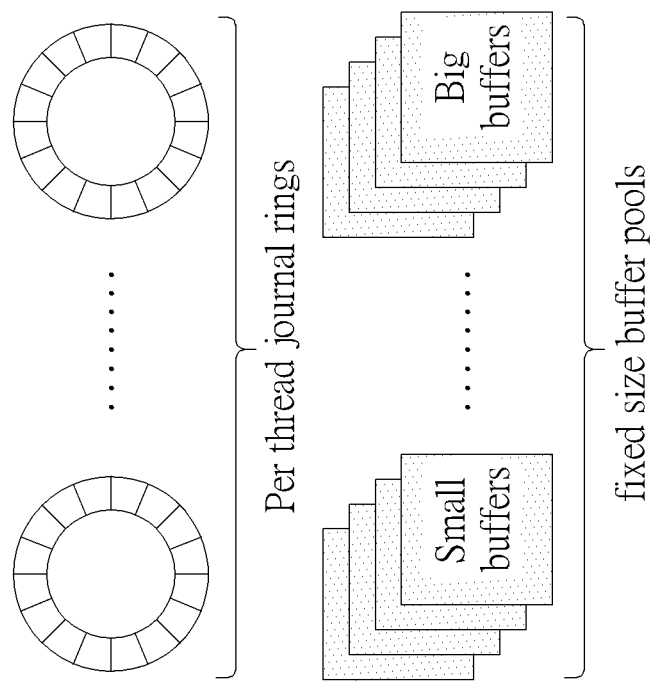
Figure 9:
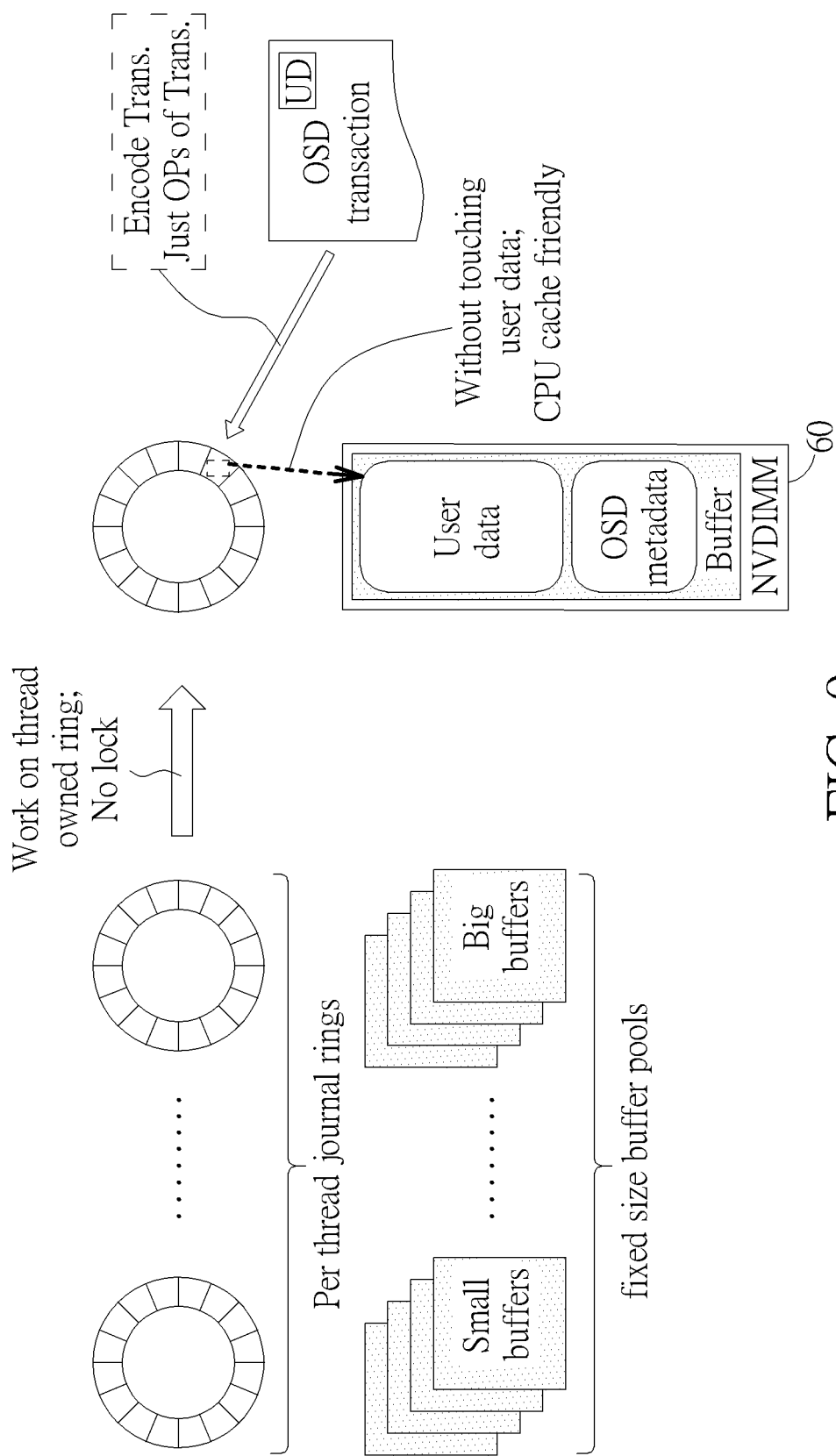
FIG. 9 illustrates another portion of the associated operations of the specialized OSD journal control scheme shown in FIG. 7.
Figure 10:
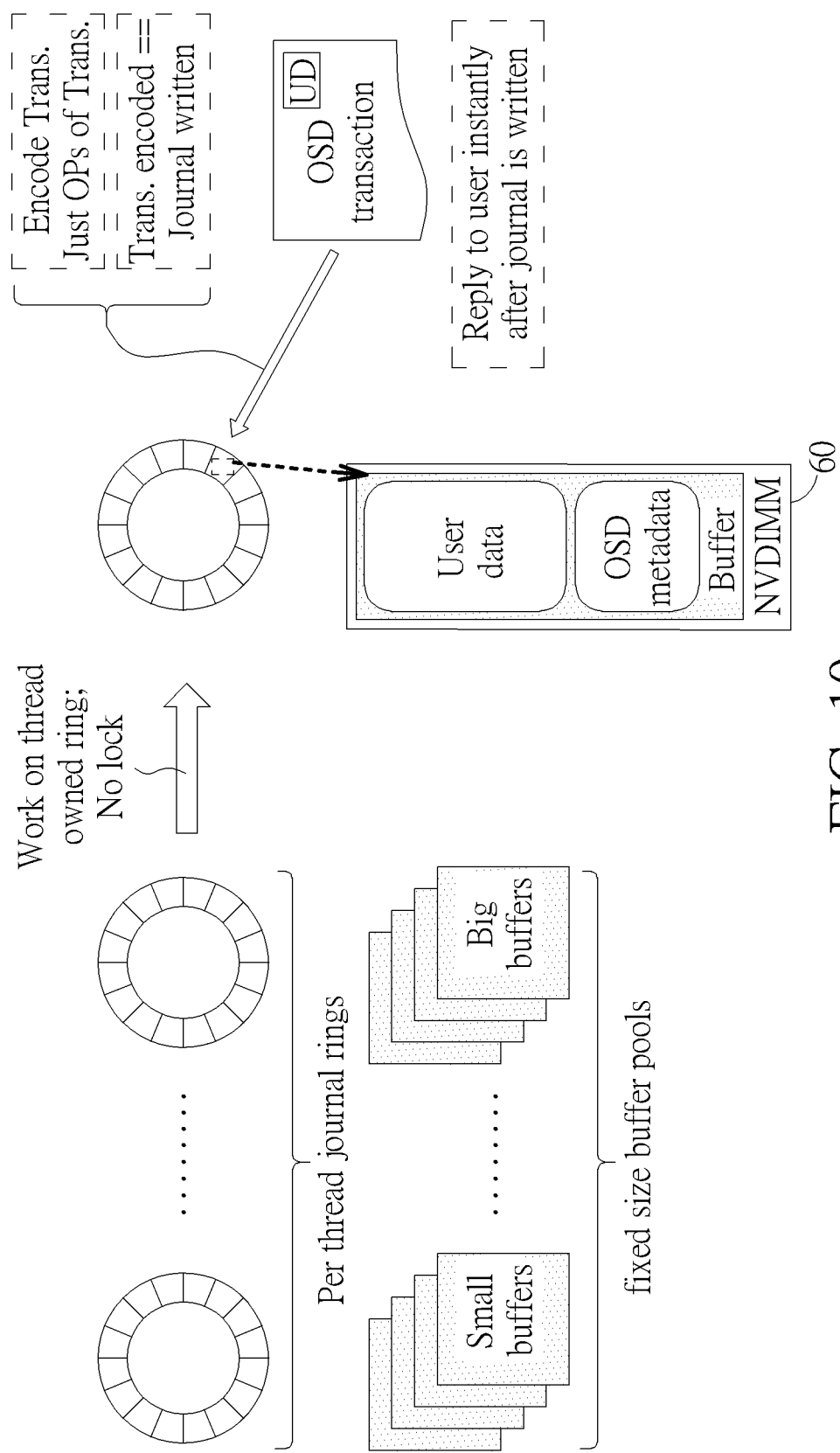
FIG. 10 illustrates another portion of the associated operations of the specialized OSD journal control scheme shown in FIG. 7.

FIG. 7 illustrates a plurality of per thread journal rings in a specialized OSD journal control scheme of the method shown in FIG. 3 and a portion of associated operations in the specialized OSD journal control scheme according to an embodiment of the present invention, and FIGS. 8-10 illustrate other portions of the associated operations in the specialized OSD journal control scheme shown in FIG. 7. Based on the specialized OSD journal control scheme, the present invention method and the associated apparatus (e.g. the host device 50, and more particularly, the processing circuit 52 running the pipeline-based accessing management module 53) may perform OSD information management with aid of the plurality of per thread journal rings (e.g. journal rings respectively corresponding to a plurality of threads, such as exclusive journal rings dedicated for the threads, respectively) and a plurality of fixed size buffer pools within the aforementioned at least one NVDIMM (e.g. the NVDIMM 60 or the plurality of NVDIMMs {60}), to prevent the problems of the original OSD journal control scheme shown in FIG. 6 (e.g. the lock, the system call, the memory copy, and the queues/schedule problems).

As shown in FIG. 7, the apparatus may perform lock free allocation of buffers to allocate a buffer corresponding to the user data, and receive the user data directly to the NVDIMM 60 (rather than to the RAM in the processing circuit 52 first), for example, from outside of the storage server 10 into the allocated buffer within the NVDIMM 60 through a network service such as that of Transmission Control Protocol (TCP), where the user write request from the messenger may comprise the user data and a header of the user data. For example, the write amplification reduction mechanism of the pipeline-based accessing management module 53 may prepare and manage the plurality of fixed size buffer pools within the aforementioned at least one NVDIMM (e.g. the NVDIMM 60 or the plurality of NVDIMMs {60}), such as a small buffer pool and a big buffer pool respectively corresponding to a smaller buffer size and a bigger buffer size, and more particularly, prepare and manage various sizes of buffers, such as small buffers the small buffer pool and big buffers in the big buffer pool, for being selected during the buffer allocation, but the present invention is not limited thereto. As a result, the host device 50 (e.g. the processing circuit 52 running the pipeline-based accessing management module 53) can prevent the lock problem of the original OSD journal control scheme shown in FIG. 6.

As shown in FIG. 8, the apparatus may write the associated OSD metadata directly to the NVDIMM 60 (rather than to the RAM in the processing circuit 52 first) while building the transaction (e.g. the OSD transaction) corresponding to the user data. For example, the transaction (e.g. the OSD transaction) corresponding to the user data may comprise a plurality of operations (OPs) such as five OPs: the user data (labeled "UD" in FIG. 8, for brevity); three packed Key-Value (KV) sets (e.g. three sets of packed KVs) that may be substantially equal to the OSD metadata, where the three packed KV sets may comprise a first packed KV set $\{(K_1, V_1)\}$ such as multiple first KV sets $\{(K_1(1), V_1(1)), (K_1(2), V_1(2)), \ldots\}$, a second packed KV set $\{(K_2, V_2)\}$ such as multiple second KV sets $\{(K_2(1), V_2(1)), (K_2(2), V_2(2)), \ldots\}$, and a third packed KV set $\{(K_3, V_3)\}$ such as multiple third KV sets $\{(K_3(1), V_3(1)), (K_3(2), V_3(2)), \ldots\}$; and a PG log. As the second, the third, and the fourth OPs such as the three packed KV sets may be regarded as the OSD metadata, the apparatus may build the OSD transaction corresponding to the user data, utilize the three packed KV sets of the OSD transaction as the OSD metadata, and write the three packed KV sets of the OSD transaction directly to the NVDIMM 60 to be the OSD metadata, having no need to perform additional processing for generating the OSD metadata. More particularly, the write amplification reduction mechanism of the pipeline-based accessing management module 53 may determine the respective sizes of the user data, the three packed KV sets, and the PG log according to the header in advance, to determine and assign the respective storage locations of the three packed KV sets within the OSD metadata to be written into the NVDIMM 60, where these storage locations that are determined according to the header in advance may be regarded as predetermined storage locations for the contents of the OSD metadata, and the OSD metadata may be appended to the user data within the NVDIMM 60 (e.g. right after the user data). As a result, when there is a need (e.g. the user data is changed), the write amplification reduction mechanism of the pipeline-based accessing management module 53 may directly change or update any portion of the OSD metadata in the NVDIMM 60 without moving (or rewriting) another portion of the OSD metadata, where the system call problem, the memory copy problem, etc. of the original OSD journal control scheme shown in FIG. 6 will not occur.

As shown in FIG. 9, the apparatus may encode the transaction (e.g. the OSD transaction) with respect to just the OPs of the transaction (labeled "Encode Trans. Just OPs of Trans." in FIG. 6, for brevity), without touching the user data, which is CPU cache friendly. As the user data and the three packed KV sets within the OSD metadata have been stored in the allocated buffer (e.g. the buffer selected from the plurality of fixed size buffer pools during the buffer allocation) within the NVDIMM 60, most of the contents of the OSD transaction are available in the NVDIMM 60, and may be accessed through address information (e.g. at least one address) pointing toward the allocated buffer, such as a buffer address pointing toward the beginning of the allocated buffer, two sub-buffer addresses respectively pointing toward the user data and the OSD metadata within the allocated buffer, a set of sub-buffer addresses respectively pointing toward the user data and the three packed KV sets (that are written to be the OSD metadata) within the allocated buffer, etc. For example, the write amplification reduction mechanism of the pipeline-based accessing management module 53 may work on a thread owned ring such as one of the plurality of per thread journal rings, without any lock such as that of the original OSD journal control scheme (labeled "No lock" in FIG. 9, for brevity), and more particularly, may encode the OSD transaction with respect to the OPs of the OSD transaction to generate and record an encoded result of the OSD transaction in the thread owned ring, where the encoded result of the OSD transaction may comprise the address information (e.g. any of the buffer address, the two sub-buffer addresses, the et of sub-buffer addresses, etc.) pointing toward the allocated buffer, and may further comprise the PG log, but the present invention is not limited thereto. As a result, the transaction that is encoded (e.g. the encoded result of the OSD transaction in the thread owned ring) may be equal to the journal that is written (labeled "Trans. encoded=Journal written" in FIG. 10, for better comprehension). As shown in FIG. 10, when the transaction such as the OSD transaction has been encoded completely, the journal such as the OSD journal has been written completely, and therefore, the transaction encoded state may be regarded as the journal written state.

Additionally, the host device 50 (e.g. the processing circuit 52 running the pipeline-based accessing management module 53) may reply to the user (e.g. the client device of the user) instantly after the journal is written. For brevity, similar descriptions for this embodiment are not repeated in detail here.

According to some embodiments, the apparatus (e.g. the host device 50, and more particularly, the processing circuit 52 running the pipeline-based accessing management module 53) may perform the associated operations of the specialized OSD journal control scheme according to a plan based on the result of parsing the header in advance. The apparatus may parse the header shown in FIG. 7 to determine the respective locations of the respective sets of information within the OSD metadata to be stored in the allocated buffer (e.g. the storage locations in the NVDIMM 60) in advance. According to the locations determined in advance, and the apparatus may write the respective sets of information within the OSD metadata directly to the NVDIMM 60 while building the transaction. As the present invention method and the associated apparatus can strive in an extreme manner to reduce the interaction with the OS kernel, the overall response time of the storage server 10 can be greatly reduced, and therefore, the overall performance can be enhanced. For brevity, similar descriptions for these embodiments are not repeated in detail here.

According to some embodiments, the plurality of fixed size buffer pools may comprise a first buffer pool, a second buffer pool, and a third buffer pool respectively corresponding to a first buffer size, a second buffer size, and a third buffer size. For example, regarding first user data (e.g. OSD data #1) having a first data size (e.g. 4 KB), the write amplification reduction mechanism of the pipeline-based accessing management module 53 may allocate a first buffer having the first buffer size (e.g. 12 KB) from the first buffer pool, for processing the first user data (e.g. the OSD data #1) and the associated storage metadata and storage journal (e.g. the OSD metadata #1 and the OSD journal #1 thereof); regarding second user data (e.g. OSD data #2) having a second data size (e.g. 12 KB), the write amplification reduction mechanism of the pipeline-based accessing management module 53 may allocate a second buffer having the second buffer size (e.g. 24 KB) from the second buffer pool, for processing the second user data (e.g. the OSD data #2) and the associated storage metadata and storage journal (e.g. the OSD metadata #2 and the OSD journal #2 thereof); and regarding third user data (e.g. OSD data #3) having a third data size (e.g. 50 KB), the write amplification reduction mechanism of the pipeline-based accessing management module 53 may allocate a third buffer having the third buffer size (e.g. 72 KB) from the third buffer pool, for processing the third user data (e.g. the OSD data #3) and the associated storage metadata and storage journal (e.g. the OSD metadata #3 and the OSD journal #3 thereof); but the present invention is not limited thereto. For brevity, similar descriptions for these embodiments are not repeated in detail here.

Figure 11:
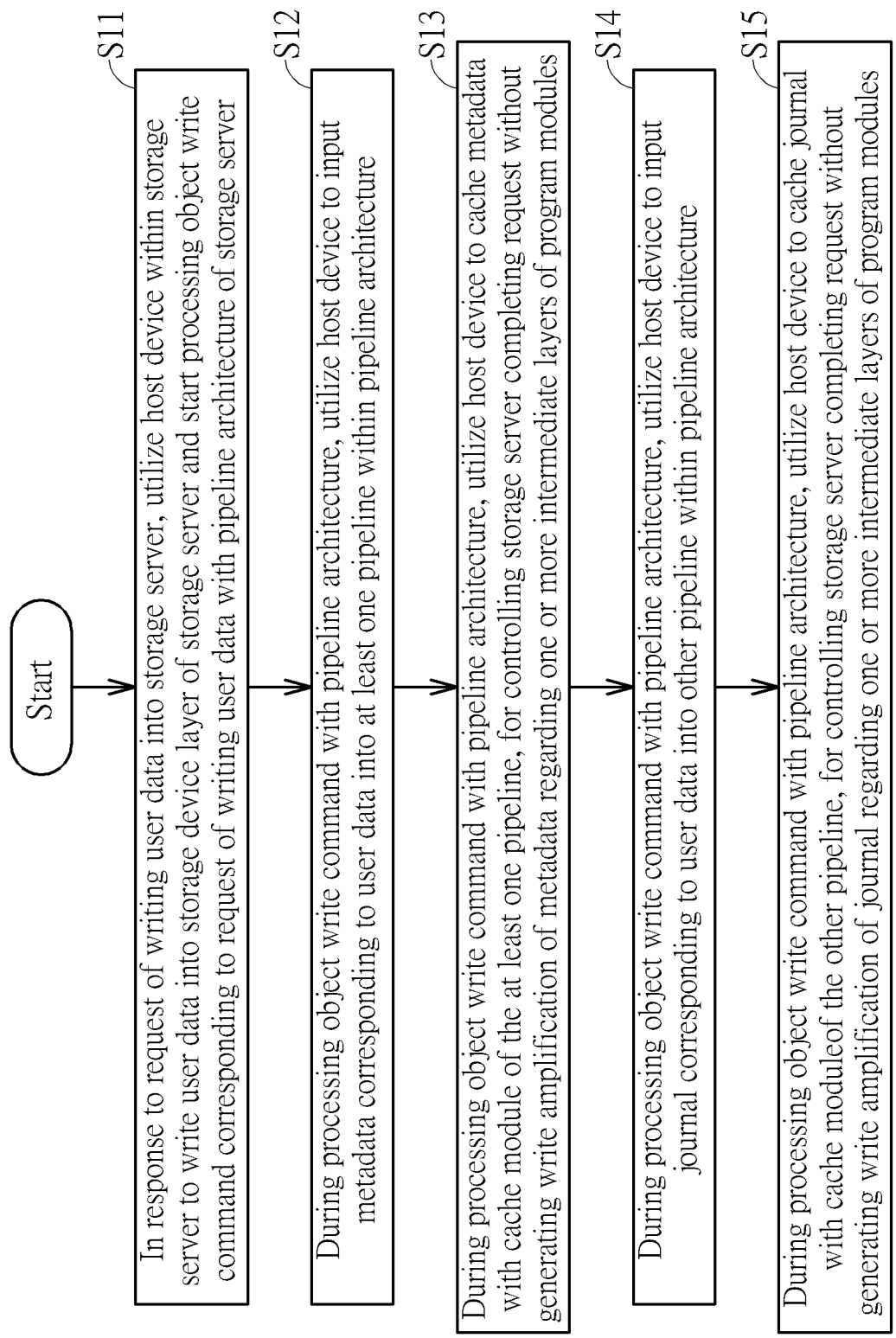
FIG. 11 is a working flow of the method shown in FIG. 3 according to an embodiment of the present invention.

FIG. 11 is a working flow of the method shown in FIG. 3 according to an embodiment of the present invention.

In Step S11, in response to the request of writing the user data (e.g. the OSD data) into the storage server 10, the storage server 10 utilizes the host device 50 within the storage server 10 to write the user data into the storage device layer of the storage server 10 and start processing the object write command corresponding to the request of writing the user data with the pipeline architecture of the storage server 10, where the storage server 10 comprises the host device 50 and the storage device layer, and the storage device layer comprises at least one storage device that is coupled to the host device 50 (e.g. the one or more storage devices within the plurality of storage devices 90, such as the storage device 100).

In Step S12, during processing the object write command with the pipeline architecture, the storage server 10 utilizes the host device 50 to input the metadata corresponding to the user data (e.g. the OSD metadata corresponding to the OSD data) into the aforementioned at least one pipeline within the pipeline architecture, where the pipeline architecture passes through the one or more intermediate layers of program modules within the program modules 52P running on the processing circuit 52 of the host device 50, and reaches the storage device layer.

In Step S13, during processing the object write command with the pipeline architecture, the storage server 10 utilizes the host device 50 to cache the metadata (e.g. the OSD metadata) with a first cache module (e.g. the Meta-Cache module 64M within the Pipeline-Cache module 64, the sub-cache module 64A, the Pipeline-Cache module 64_1, etc.) of the aforementioned at least one pipeline, for controlling the storage server 10 completing the request without generating any write amplification of the metadata (e.g. the OSD metadata) regarding the one or more intermediate layers of program modules, where the first cache module is a hardware pipeline module outside the storage device layer.

In Step S14, during processing the object write command with the pipeline architecture, the storage server 10 utilizes the host device 50 to input the journal corresponding to the user data (e.g. the OSD journal corresponding to the OSD data) into the other pipeline within the pipeline architecture.

In Step S15, during processing the object write command with the pipeline architecture, the storage server 10 utilizes the host device 50 to cache the journal (e.g. the OSD journal) with a second cache module (e.g. another Cache module within the Pipeline-Cache module 64, the sub-cache module 64B, the Pipeline-Cache module 64_2, etc.) of the other pipeline, for controlling the storage server 10 completing the request without generating any write amplification of the journal (e.g. the OSD journal) regarding the one or more intermediate layers of program modules, where the second cache module is a hardware pipeline module outside the storage device layer.

According to this embodiment, the host device 50 may cache the metadata (e.g. the OSD data) with the first cache module of the aforementioned at least one pipeline, to prevent a plurality of subsequent pipeline modules of the aforementioned at least one pipeline (e.g. the subsequent modules mentioned in the embodiment shown in FIG. 3, such as the KV module and the EXT4 module) from generating derivative information of the metadata, and more particularly, prevent the derivative information of the metadata from being generated and written into the storage device layer, where the one or more intermediate layers of program modules comprises the plurality of subsequent pipeline modules of the aforementioned at least one pipeline. In addition, the first cache module and the second cache module may be positioned within the aforementioned at least one NVDIMM (e.g. the NVDIMM 60 or the plurality of NVDIMMs {60}), and any cache module within the first cache module and the second cache module may represent a storage region within the volatile memory of a certain NVDIMM within the aforementioned at least one NVDIMM. For example, the first cache module and the second cache module (e.g. the sub-cache modules 64A and 64B) may represent different storage regions within the volatile memory 62 of the NVDIMM 60, respectively. For another example, the first cache module and the second cache module (e.g. the Pipeline-Cache modules 64_1 and 64_2) may represent respective storage regions of the respective volatile memories 62_1 and 62_2 of the NVDIMMs 60_1 and 60_2, respectively. Additionally, the aforementioned at least one NVDIMM may provide at least one hardware pipeline module (e.g. one or more hardware pipeline modules) outside the storage device layer, such as a plurality of hardware pipeline modules comprising the first cache module and the second cache module. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11.

Figure 12:
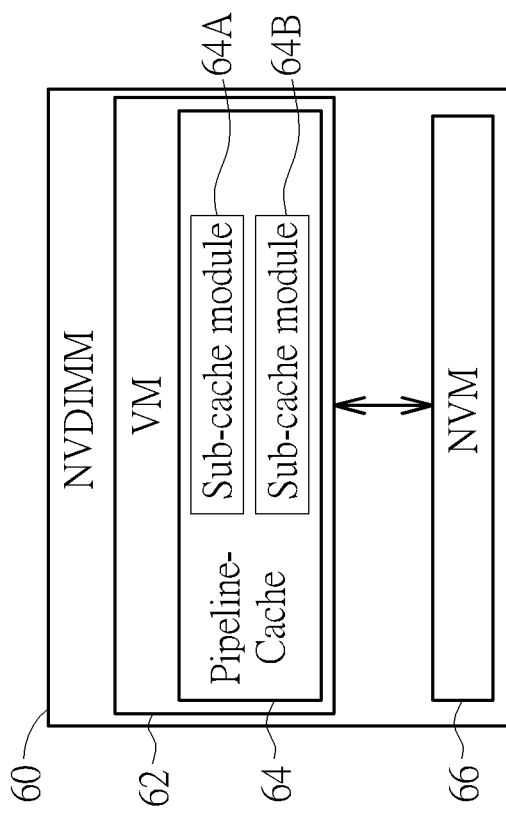
FIG. 12 illustrates some sub-modules of the Pipeline-Cache module shown in FIG. 1 according to an embodiment of the present invention.

FIG. 12 illustrates some sub-modules of the Pipeline-Cache module 64 shown in FIG. 1 according to an embodiment of the present invention. As shown in FIG. 12, the Pipeline-Cache module 64 may comprise the sub-cache modules 64A and 64B, for cashing the storage metadata (e.g. the OSD metadata) and the storage journal (e.g. the OSD journal), respectively. For brevity, similar descriptions for this embodiment are not repeated in detail here.

Figure 13:
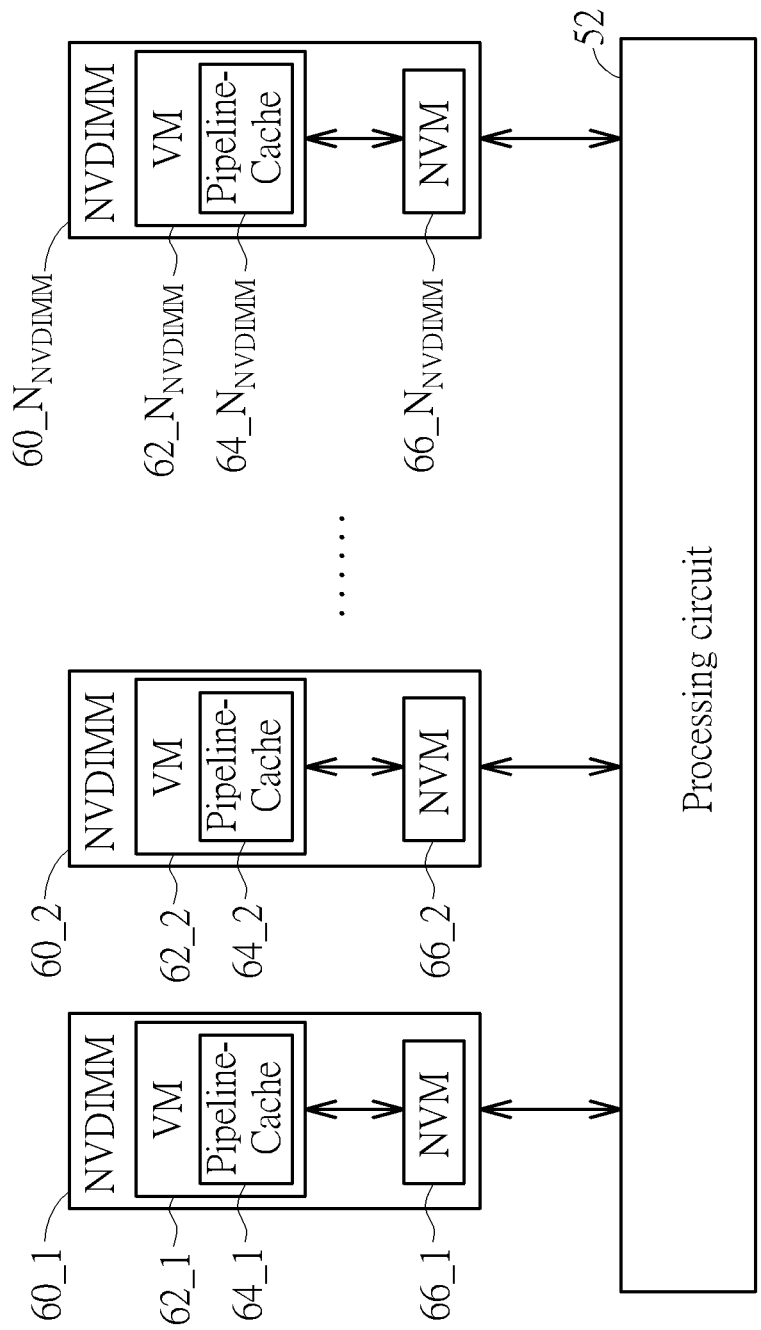
FIG. 13 illustrates some NVDIMMs of the host device shown in FIG. 1 according to an embodiment of the present invention.

FIG. 13 illustrates some NVDIMMs of the host device 10 shown in FIG. 1 according to an embodiment of the present invention. As shown in FIG. 13, the host device 10 may comprise the $N_{NVDIMM}$ NVDIMMs {60_1, 60_2, ..., 60_$N_{NVDIMM}$}. For example, the NVDIMM 60_1 may comprise the volatile memory 62_1 and the NV memory 66_1 (respectively labeled "VM" and "NVM" in FIG. 13, for brevity) that may be arranged to store (e.g. buffer or cache) information for the processing circuit 52 and preserve the information in the volatile memory 62_1 for the processing circuit 52, respectively, and may be coupled to the processing circuit 52, for being accessed by the processing circuit 52; the NVDIMM 60_2 may comprise the volatile memory 62_2 and the NV memory 66_2 (respectively labeled "VM" and "NVM" in FIG. 13, for brevity) that may be arranged to store (e.g. buffer or cache) information for the processing circuit 52 and preserve the information in the volatile memory 62_2 for the processing circuit 52, respectively, and may be coupled to the processing circuit 52, for being accessed by the processing circuit 52; and the rest may be deduced by analogy. Similarly, the NVDIMM 60_$N_{NVDIMM}$ may comprise the volatile memory 62_$N_{NVDIMM}$ and the NV memory 66_$N_{NVDIMM}$ (respectively labeled "VM" and "NVM" in FIG. 13, for brevity) that may be arranged to store (e.g. buffer or cache) information for the processing circuit 52 and preserve the information in the volatile memory 62_$N_{NVDIMM}$ for the processing circuit 52, respectively, and may be coupled to the processing circuit 52, for being accessed by the processing circuit 52. In addition, the Pipeline-Cache modules 64_1, 64_2, ... and 64_$N_{NVDIMM}$ (respectively labeled "Pipeline-Cache" in FIG. 13, for brevity) may be set up within the volatile memories 62_1, 62_2, ... and 62_$N_{NVDIMM}$, respectively. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing pipeline-based accessing management in a server, the method being applied to the server, the method comprising:
   in response to a request of writing user data into the server, utilizing a host device within the server to start processing an object write command corresponding to the request of writing the user data with a pipeline architecture of the server;
   during processing the object write command with the pipeline architecture, utilizing the host device to input metadata corresponding to the user data into at least one pipeline within the pipeline architecture, wherein the pipeline architecture passes through one or more intermediate layers of program modules within a plurality of program modules running on a processing circuit of the host device, and reaches a storage device layer of the server; and
   during processing the object write command with the pipeline architecture, utilizing the host device to cache the metadata with a first cache module of said at least one pipeline, for controlling the server completing the request without generating write amplification of the metadata regarding the one or more intermediate layers of program modules, wherein the first cache module is a hardware pipeline module outside the storage device layer.

2. The method of claim 1, wherein utilizing the host device to cache the metadata with the first cache module of said at least one pipeline further comprises:
   utilizing the host device to cache the metadata with the first cache module of said at least one pipeline, to prevent a plurality of subsequent pipeline modules of said at least one pipeline from generating derivative information of the metadata, wherein the one or more intermediate layers of program modules comprises the plurality of subsequent pipeline modules of said at least one pipeline.

3. The method of claim 1, wherein utilizing the host device to cache the metadata with the first cache module of said at least one pipeline further comprises:
   utilizing the host device to cache the metadata with the first cache module of said at least one pipeline, to prevent derivative information of the metadata from being generated and written into the storage device layer.

4. The method of claim 1, wherein the host device comprises at least one non-volatile dual in-line memory module (NVDIMM), and the first cache module is positioned within said at least one NVDIMM.

5. The method of claim 4, wherein an NVDIMM within said at least one NVDIMM comprises a volatile memory and a non-volatile (NV) memory arranged to store information for the processing circuit and preserve the information in the volatile memory for the processing circuit, respectively; and the first cache module represents a storage region within the volatile memory.

6. The method of claim 1, further comprising:
   during processing the object write command with the pipeline architecture, utilizing the host device to input a journal corresponding to the user data into another pipeline within the pipeline architecture; and
   during processing the object write command with the pipeline architecture, utilizing the host device to cache the journal with a second cache module of the other pipeline, for controlling the server completing the request without generating write amplification of the journal regarding the one or more intermediate layers of program modules, wherein the second cache module is a hardware pipeline module outside the storage device layer.

7. The method of claim 6, wherein the host device comprises at least one non-volatile dual in-line memory module (NVDIMM), and the first cache module and the second cache module are positioned within said at least one NVDIMM.

8. The method of claim 7, wherein an NVDIMM within said at least one NVDIMM comprises a volatile memory and a non-volatile (NV) memory arranged to store information for the processing circuit and preserve the information in the volatile memory for the processing circuit, respectively; and any cache module within the first cache module and the second cache module represents a storage region within the volatile memory.

9. The method of claim 1, wherein the pipeline architecture starts from an upper layer within the plurality of program modules running on the processing circuit of the host device, passes through the one or more intermediate layers of program modules, and reaches the storage device layer; and the method further comprises:
   utilizing at least one non-volatile dual in-line memory module (NVDIMM) to provide at least one hardware pipeline module outside the storage device layer, wherein said at least one hardware pipeline module comprises the first cache module.

10. The method of claim 9, wherein said at least one hardware pipeline module comprises a plurality of hardware pipeline modules; and the method further comprises:
    during processing the object write command with the pipeline architecture, utilizing the host device to input a journal corresponding to the user data into another pipeline within the pipeline architecture; and
    during processing the object write command with the pipeline architecture, utilizing the host device to cache the journal with a second cache module of the other pipeline, for controlling the server completing the request without generating write amplification of the journal regarding the one or more intermediate layers of program modules, wherein the plurality of hardware pipeline modules comprises the first cache module and the second cache module.

11. A host device, comprising:
    a processing circuit, arranged to control the host device to perform pipeline-based accessing management in a server, wherein:
    in response to a request of writing user data into the server, the host device within the server starts processing an object write command corresponding to the request of writing the user data with a pipeline architecture of the server;
    during processing the object write command with the pipeline architecture, the host device inputs metadata corresponding to the user data into at least one pipeline within the pipeline architecture, wherein the pipeline architecture passes through one or more intermediate layers of program modules within a plurality of program modules running on the processing circuit of the host device, and reaches a storage device layer of the server; and
    during processing the object write command with the pipeline architecture, the host device caches the metadata with a first cache module of said at least one pipeline, for controlling the server completing the request without generating write amplification of the metadata regarding the one or more intermediate layers of program modules, wherein the first cache module is a hardware pipeline module outside the storage device layer.

12. The host device of claim 11, wherein the host device caches the metadata with the first cache module of said at least one pipeline, to prevent a plurality of subsequent pipeline modules of said at least one pipeline from generating derivative information of the metadata, wherein the one or more intermediate layers of program modules comprises the plurality of subsequent pipeline modules of said at least one pipeline.

13. The host device of claim 11, wherein the host device caches the metadata with the first cache module of said at least one pipeline, to prevent derivative information of the metadata from being generated and written into the storage device layer.

14. The host device of claim 11, further comprising:
at least one non-volatile dual in-line memory module (NVDIMM), wherein the first cache module is positioned within said at least one NVDIMM.

15. The host device of claim 14, wherein said at least one NVDIMM comprises:
an NVDIMM, comprising:
a volatile memory, arranged to store information for the processing circuit; and
a non-volatile (NV) memory, arranged to preserve the information in the volatile memory for the processing circuit;
wherein the first cache module represents a storage region within the volatile memory.

16. The host device of claim 11, wherein:
during processing the object write command with the pipeline architecture, the host device inputs a journal corresponding to the user data into another pipeline within the pipeline architecture; and
during processing the object write command with the pipeline architecture, the host device caches the journal with a second cache module of the other pipeline, for controlling the server completing the request without generating write amplification of the journal regarding the one or more intermediate layers of program modules, wherein the second cache module is a hardware pipeline module outside the storage device layer.

17. The host device of claim 16, further comprising:
at least one non-volatile dual in-line memory module (NVDIMM), wherein the first cache module and the second cache module are positioned within said at least one NVDIMM.

18. The host device of claim 17, wherein said at least one NVDIMM comprises:
an NVDIMM, comprising:
a volatile memory, arranged to store information for the processing circuit; and
a non-volatile (NV) memory, arranged to preserve the information in the volatile memory for the processing circuit;
wherein any cache module within the first cache module and the second cache module represents a storage region within the volatile memory.

19. The host device of claim 11, wherein the pipeline architecture starts from an upper layer within the plurality of program modules running on the processing circuit of the host device, passes through the one or more intermediate layers of program modules, and reaches the storage device layer; and the host device further comprises:
at least one non-volatile dual in-line memory module (NVDIMM), arranged to provide at least one hardware pipeline module outside the storage device layer, wherein said at least one hardware pipeline module comprises the first cache module.

20. The host device of claim 19, wherein said at least one hardware pipeline module comprises a plurality of hardware pipeline modules, wherein:
during processing the object write command with the pipeline architecture, the host device inputs a journal corresponding to the user data into another pipeline within the pipeline architecture; and
during processing the object write command with the pipeline architecture, the host device caches the journal with a second cache module of the other pipeline, for controlling the server completing the request without generating write amplification of the journal regarding the one or more intermediate layers of program modules, wherein the plurality of hardware pipeline modules comprises the first cache module and the second cache module.

21. The host device of claim 11, further comprising:
a case, arranged to install multiple components of the host device, wherein the multiple components of the host device comprise the processing circuit.

22. A server, comprising:
a host device, arranged to control operations of the server, the host device comprising:
a processing circuit, arranged to control the host device to perform pipeline-based accessing management in the server;
wherein:
in response to a request of writing user data into the server, the host device within the server starts processing an object write command corresponding to the request of writing the user data with a pipeline architecture of the server;
during processing the object write command with the pipeline architecture, the host device inputs metadata corresponding to the user data into at least one pipeline within the pipeline architecture, wherein the pipeline architecture passes through one or more intermediate layers of program modules within a plurality of program modules running on the processing circuit of the host device, and reaches a storage device layer of the server; and
during processing the object write command with the pipeline architecture, the host device caches the metadata with a first cache module of said at least one pipeline, for controlling the server completing the request without generating write amplification of the metadata regarding the one or more intermediate layers of program modules, wherein the first cache module is a hardware pipeline module outside the storage device layer.

* * * * *